United States Patent
Lee et al.

(10) Patent No.: US 10,127,167 B2
(45) Date of Patent: *Nov. 13, 2018

(54) N-PHASE SIGNAL TRANSITION ALIGNMENT

(71) Applicant: QUALCOMM Incorporated, San Diego, CA (US)

(72) Inventors: Chulkyu Lee, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,645

(22) Filed: Dec. 9, 2016

(65) Prior Publication Data

US 2017/0091141 A1     Mar. 30, 2017

Related U.S. Application Data

(63) Continuation of application No. 15/041,901, filed on Feb. 11, 2016, now Pat. No. 9,842,073, which is a
(Continued)

(51) Int. Cl.
*H04L 7/00* (2006.01)
*G06F 13/36* (2006.01)
(Continued)

(52) U.S. Cl.
CPC .......... *G06F 13/36* (2013.01); *G06F 13/4063* (2013.01); *G06F 13/4068* (2013.01);
(Continued)

(58) Field of Classification Search
CPC ............................ H04L 7/0008; H04L 7/0079
See application file for complete search history.

(56) References Cited

U.S. PATENT DOCUMENTS 4,468,787 A    8/1984  Keiper, Jr.
5,872,819 A    2/1999  Carsello et al.
(Continued)

FOREIGN PATENT DOCUMENTS

JP    2007511118 A    4/2007
JP    2007142860 A    6/2007
(Continued)

OTHER PUBLICATIONS

International Search Report and Written Opinion—PCT/US2014/050108—ISA/EPO—dated Oct. 24, 2014.
(Continued)

*Primary Examiner* — Chieh M Fan
*Assistant Examiner* — Gina McKie
(74) *Attorney, Agent, or Firm* — Loza & Loza LLP

(57) ABSTRACT

System, methods and apparatus are described that facilitate transmission of data, particularly between two devices within an electronic apparatus. Information is transmitted in N-phase polarity encoded symbols. Drivers may be adapted or configured to align state transitions on two or more connectors in order to minimize a transition period between consecutive symbols. The drivers may include circuits that advance or delay certain transitions. The drivers may include pre-emphasis circuits that operate to drive the state of a connector for a portion of the transition period, even when the connector is transitioned to an undriven state.

30 Claims, 15 Drawing Sheets

Related U.S. Application Data continuation of application No. 14/453,346, filed on Aug. 6, 2014, now Pat. No. 9,276,731.

(60) Provisional application No. 61/863,695, filed on Aug. 8, 2013.

(51) Int. Cl.
*G06F 13/42* (2006.01)
*H04L 25/49* (2006.01)
*G06F 13/40* (2006.01)
*H04L 25/14* (2006.01)

(52) U.S. Cl.
CPC ...... *G06F 13/4278* (2013.01); *G06F 13/4282* (2013.01); *H04L 7/0033* (2013.01); *H04L 25/14* (2013.01); *H04L 25/4917* (2013.01); *H04L 25/4919* (2013.01); *Y02D 10/14* (2018.01); *Y02D 10/151* (2018.01)

(56) References Cited

U.S. PATENT DOCUMENTS

| | | | |
|---|---|---|---|
| 5,905,716 A | 5/1999 | Vidales | |
| 6,055,117 A | 4/2000 | Hansen et al. | |
| 7,093,145 B2 | 8/2006 | Werner et al. | |
| 7,190,284 B1 | 3/2007 | Dye et al. | |
| 7,308,048 B2 | 12/2007 | Wei | |
| 7,339,502 B2 | 3/2008 | Furtner | |
| 7,412,016 B2 | 8/2008 | Stojanovic | |
| 7,443,319 B2 | 10/2008 | Schwartz et al. | |
| 7,535,957 B2 | 5/2009 | Ozawa et al. | |
| 7,961,832 B2 | 6/2011 | Scheffler | |
| 8,064,535 B2 | 11/2011 | Wiley et al. | |
| 8,121,186 B2 | 2/2012 | Chmelar et al. | |
| 8,305,244 B2 | 11/2012 | Said | |
| 8,472,551 B2 | 6/2013 | Wiley et al. | |
| 9,148,198 B1 * | 9/2015 | Zhang | H04L 25/0264 |
| 9,276,731 B2 | 3/2016 | Lee et al. | |
| 9,485,080 B1 | 11/2016 | Duan et al. | |
| 2003/0039326 A1 | 2/2003 | Hall et al. | |
| 2005/0068082 A1 | 3/2005 | Nguyen et al. | |
| 2005/0181304 A1 | 8/2005 | Araki et al. | |
| 2006/0181304 A1 | 8/2006 | Dreps et al. | |
| 2007/0273402 A1 | 11/2007 | Zethmayr | |
| 2009/0015304 A1 | 1/2009 | Yin et al. | |
| 2009/0225873 A1 | 9/2009 | Lee et al. | |
| 2009/0241006 A1 | 9/2009 | Liikanen et al. | |
| 2010/0223413 A1 | 9/2010 | Liu | |
| 2010/0253361 A1 * | 10/2010 | Nakamura | G01N 27/42 324/464 |
| 2011/0220862 A1 * | 9/2011 | Arita | H01L 27/2409 257/4 |
| 2012/0250746 A1 | 10/2012 | Sonntag | |
| 2013/0266047 A1 | 10/2013 | Sudhakaran et al. | |
| 2014/0112401 A1 | 4/2014 | Wiley et al. | |
| 2014/0184857 A1 | 7/2014 | Stokes et al. | |
| 2014/0241465 A1 | 8/2014 | Itoigawa et al. | |
| 2014/0270026 A1 | 9/2014 | Sengoku et al. | |
| 2015/0030112 A1 | 1/2015 | Wiley et al. | |
| 2016/0013926 A1 | 1/2016 | Kil et al. | |
| 2016/0119169 A1 | 4/2016 | Schober | |
| 2016/0127159 A1 * | 5/2016 | Koli | H04L 25/0272 375/259 |
| 2016/0162423 A1 | 6/2016 | Lee et al. | |
| 2016/0350258 A1 * | 12/2016 | Mangano | G06F 13/4027 |
| 2017/0039163 A1 | 2/2017 | Sejpal et al. | |
| 2017/0091141 A1 | 3/2017 | Lee et al. | |

FOREIGN PATENT DOCUMENTS

| | | |
|---|---|---|
| JP | 2009077099 A | 4/2009 |
| TW | 187820 B | 7/1992 |
| TW | 540208 B | 7/2003 |
| TW | 201220719 A | 5/2012 |
| WO | WO-2005029743 A2 | 3/2005 |
| WO | WO-2005041164 A1 | 5/2005 |
| WO | WO-08109478 | 9/2008 |
| WO | WO-2009111208 | 9/2009 |
| WO | WO-2015013254 A1 | 1/2015 |

OTHER PUBLICATIONS

European Search Report—EP17191695—Search Authority—Munich—dated Apr. 26, 2018.

* cited by examiner

N-PHASE SIGNAL TRANSITION ALIGNMENT

CROSS-REFERENCE TO RELATED APPLICATIONS

This application is a continuation of U.S. patent application Ser. No. 15/041,901 filed Feb. 11, 2016, which is a continuation of U.S. patent application Ser. No. 14/453,346 filed Aug. 6, 2014, which issued as U.S. Pat. No. 9,276,731 on Mar. 1, 2016, and which claimed priority to and the benefit of U.S. Provisional Patent Application No. 61/863,695 filed Aug. 8, 2013, the entire content of these applications being incorporated herein by reference.

BACKGROUND

Field

The present disclosure relates generally to high-speed data communications interfaces, and more particularly, signal conditioning in multi-wire, multi-phase data communication links.

Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DSI) standard specified by the Mobile Industry Processor Interface Alliance (MIPI).

In a multi-wire interface, the maximum speed of the communication link and the ability of a clock-data recovery (CDR) circuit to recover clock information may be limited by the maximum time variation related to transitions of signals transmitted on the communication link. In a multi-wire interface, transitions on different wires may exhibit different variations of signal transition times, which can cause the outputs of receivers in a receiving device to change at different times with respect to a data or symbol boundary. Large transition time differences in multi-wire signals often requires the implementation of a delay element in the CDR circuit, where the delay element has a minimum delay at least as long as the difference between the min and max receiver transition events. The maximum time of this delay element can restrict the throughput on the communication link by significantly limiting the period of the transmission clock.

SUMMARY

Embodiments disclosed herein provide systems, methods and apparatus that enable improved transmission rates on physical interfaces between devices within an apparatus. The apparatus may include a mobile terminal having multiple Integrated Circuit (IC) devices, which may be collocated in an electronic apparatus and communicatively coupled through one or more data links.

In an aspect of the disclosure, a data transfer method includes determining differences between each pair of consecutive symbols in a plurality of symbols to be transmitted on three or more connectors, estimating a duration of a transition interval at a symbol boundary between the pair of consecutive symbols based on the differences, and modifying operation of one or more drivers of the three or more connectors to reduce the duration of the transition interval when the duration of the transition interval is estimated to exceed a threshold period. The differences between each pair of consecutive symbols may relate to signaling states of the three or more connectors. Each symbol may define one of at least three signaling states for each of the three or more connectors.

In another aspect, modifying operation of the one or more drivers may cause temporal alignment of two or more outputs of state transition detection circuits in a receiver. The state transition detection circuits may be configured to compare signaling states of different pairs of the three or more connectors. Causing temporal alignment may include causing transitions to occur within a time period that is less than the threshold period.

In another aspect, modifying the operation of the one or more drivers includes configuring one or more delays to cause the driver to initiate a state transition on a first connector before a corresponding state transition is initiated on a second connector.

In another aspect, modifying the operation of the one or more drivers includes configuring one or more delays to cause the driver to initiate a state transition on a first connector after a corresponding state transition is initiated on a second connector.

In another aspect, modifying the operation of the one or more drivers includes configuring one or more delays to cause the driver to delay or advance initiation of a state transition on a first connector with respect to initiation of a corresponding state transition on a second connector.

In another aspect, modifying the operation of the one or more drivers includes delaying or advancing an initiation of a state transition on at least one connector when the duration of the transition interval is estimated to exceed the threshold period, and refraining from delaying or advancing state transitions on the three or more connectors when the duration of the transition interval is estimated to be less than the threshold period.

In another aspect, modifying the operation of the one or more drivers includes actively driving one connector during at least a portion of the transition interval when the duration of the transition interval is estimated to exceed the threshold period, and refraining from driving the one connector while a second symbol of the pair of consecutive symbols is transmitted when the duration of the transition interval is estimated to be less than the threshold period.

In another aspect, estimating the duration of the transition interval includes determining a signaling state transition time for each of the three or more connectors relative to the symbol boundary, and estimating delays between the symbol boundary and transitions in outputs of each of a plurality of differential receivers at a receiver. Each of the plurality of differential receivers may be coupled to a different pair of the three or more connectors.

In another aspect, the three or more connectors may include at least three wires and at least one wire may be in an undriven state during transmission of each symbol.

In an aspect of the disclosure, an apparatus includes means for determining differences between each pair of consecutive symbols in a plurality of symbols to be transmitted on three or more connectors, means for estimating a duration of a transition interval at a symbol boundary between the pair of consecutive symbols based on the differences, and means for modifying operation of one or more drivers of the three or more connectors to reduce the duration of the transition interval when the duration of the transition interval is estimated to exceed a threshold period. The differences between each pair of consecutive symbols may relate to signaling states of the three or more connectors. Each symbol may define one of at least three signaling states for each of the three or more connectors.

In an aspect of the disclosure, an apparatus includes a plurality of connectors communicatively coupling two devices in a terminal, and a processing circuit. The processing circuit may be configured to determine differences between each pair of consecutive symbols in a plurality of symbols to be transmitted on three or more connectors, estimate a duration of a transition interval at a symbol boundary between the pair of consecutive symbols based on the differences, and modify operation of one or more drivers of the three or more connectors to reduce the duration of the transition interval when the duration of the transition interval is estimated to exceed a threshold period. The differences may relate to signaling states of the three or more connectors. Each symbol may define one of at least three signaling states for each of the three or more connectors.

In an aspect of the disclosure, processor-readable storage medium has one or more instructions. The one or more instructions may be executed by at least one processing circuit. The one or more instructions may cause the at least one processing circuit to determine differences between each pair of consecutive symbols in a plurality of symbols to be transmitted on three or more connectors, estimate a duration of a transition interval at a symbol boundary between the pair of consecutive symbols based on the differences, and modify operation of one or more drivers of the three or more connectors to reduce the duration of the transition interval when the duration of the transition interval is estimated to exceed a threshold period. The differences between each pair of consecutive symbols may relate to signaling states of the three or more connectors. Each symbol may define one of at least three signaling states for each of the three or more connectors.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
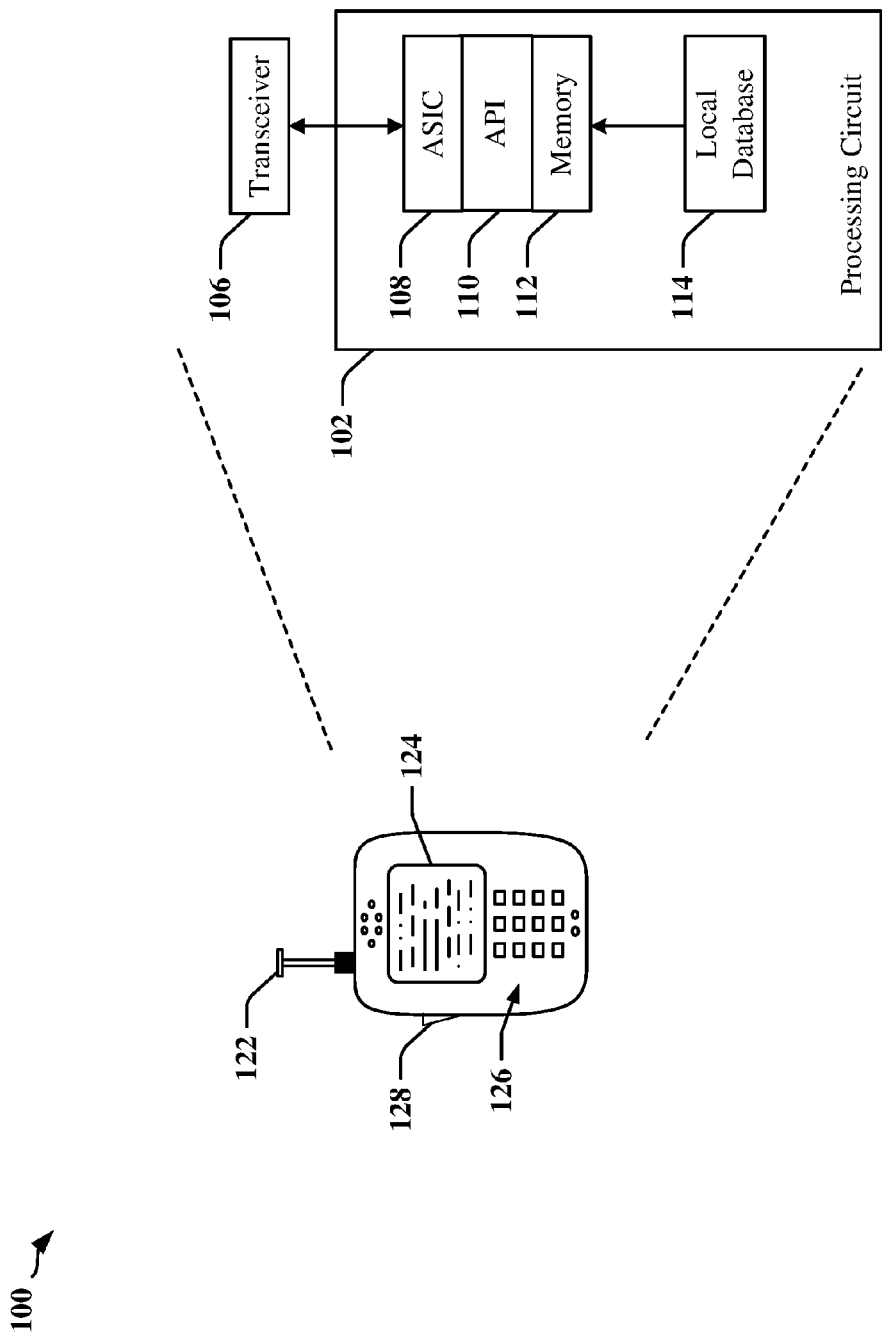
FIG. 1 depicts an apparatus employing a data link between IC devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts a simplified example of an apparatus that employs a communication link between IC devices. The apparatus 100 may include a communications transceiver 106 operably coupled to a processing circuit 102. In one example, the apparatus 100 may include a wireless communication device that communicates through a radio frequency (RF) transceiver 106 with a radio access network (RAN), a core access network, the Internet and/or another network. The processing circuit 102 may include an application-specific integrated circuit (ASIC) 108 and/or one or more other IC devices. The ASIC 108 may include one or more processing devices, logic circuits, and so on. The processing circuit 102 may include and/or be coupled to processor readable storage such as a memory device 112 that may maintain instructions that may be executed by a processor of the processing circuit 102, and data that may be manipulated by the processing circuit 102. Certain functions of the processing circuit 102 may be controlled by one or more of an operating system and an application programming interface (API) 110 layer that supports and enables execution of software modules residing in storage media, such as the memory device 112. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls, such as a keypad 126, a button, rocker or slider switch 128, and/or other components.

Figure 2:
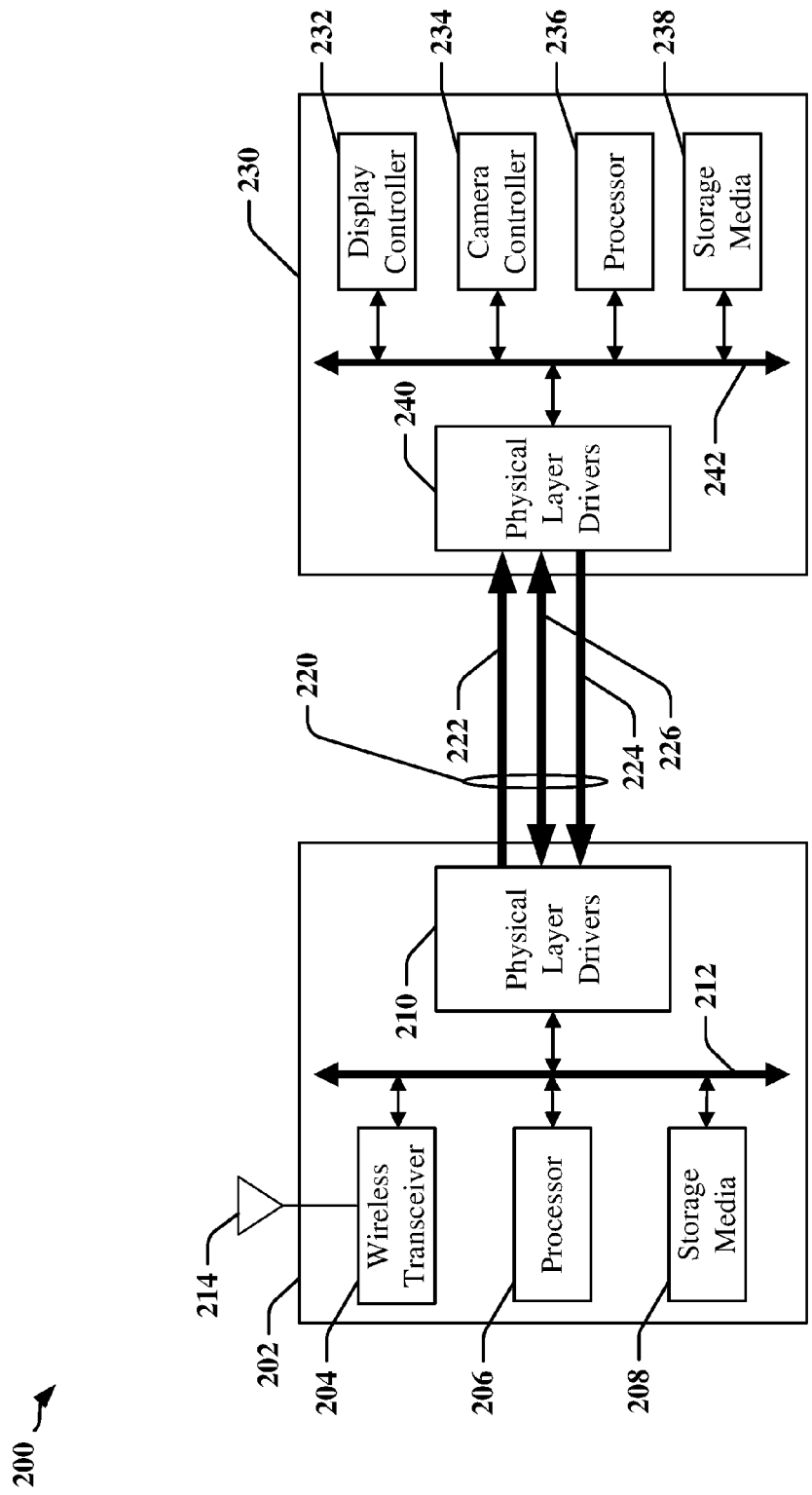
FIG. 2 illustrates a system architecture for an apparatus employing a data link between IC devices.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, s gaming device, an appliance, a wearable computing device, or the like. The apparatus 200 may include a plurality of IC devices 202 and 230 that exchange data and control information through a communication link 220. The communication link 220 may be used to connect the IC devices 202 and 230, whether the IC devices 202, 230 are located in close proximity to one another, or located in physically different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in a half-duplex mode and/or in a full-duplex mode. One or more channels 222 and/or 224 may be unidirectional. The communication link 220 may be asymmetrical, providing higher bandwidth in one direction. In one example, a first communications channel 222 may be referred to as a forward link 222 while a second communications channel 224 may be referred to as a reverse link 224. The first IC device 202 may be designated as a host system or a transmitter, while the second IC device 230 may be designated as a client system or a receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor 206, 236, which may be provided in a processing circuit, computing circuit, or other circuit. In one example, the first IC device 202 may be adapted to perform core functions of the apparatus 200, including maintaining wireless communications through a wireless transceiver 204 and an antenna 214, while the second IC device 230 may be configured to support a user interface that manages or operates a display controller 232, and may control operations of a camera or video input device using a camera controller 234. Other features supported by one or more of the IC devices 202 and 230 may include a keyboard, a voice-recognition component, global positioning systems, biometric recognition systems, motion sensors, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as a data rate (or data transfer rate) and/or a transmitter clocking rate. The forward and reverse data rates may be substantially the same or may differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate data, control, command and other information between the first IC device 202 and the second IC device 230 in accordance with an industry or other standard.

Industry standards may be application specific. In one example, the MIPI standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects between components 202 and 230 within a mobile device. These interfaces may include complimentary metal-oxide-semiconductor (CMOS) parallel busses providing relatively low bit rates with slow edges to avoid electromagnetic interference (EMI) issues.

The communication link 220 of FIG. 2 may be implemented as a wired bus that includes a plurality of signal wires (denoted as M wires). The M wires may be configured to carry N-phase encoded data in a high-speed digital interface, such as in a display interface. The M wires may facilitate N-phase polarity encoding on one or more of the channels 222, 224 and/or 226. The physical layer drivers 210 and 240 may be configured or adapted to generate N-phase polarity encoded data symbols for transmission on the communication link 220, and/or to decode N-phase polarity encoded data symbols received from the communication link 220. The use of N-phase polarity encoding provides high speed data transfer and may consume half or less of the power of other interfaces because, for example, fewer drivers are active in N-phase polarity encoded data links 220.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
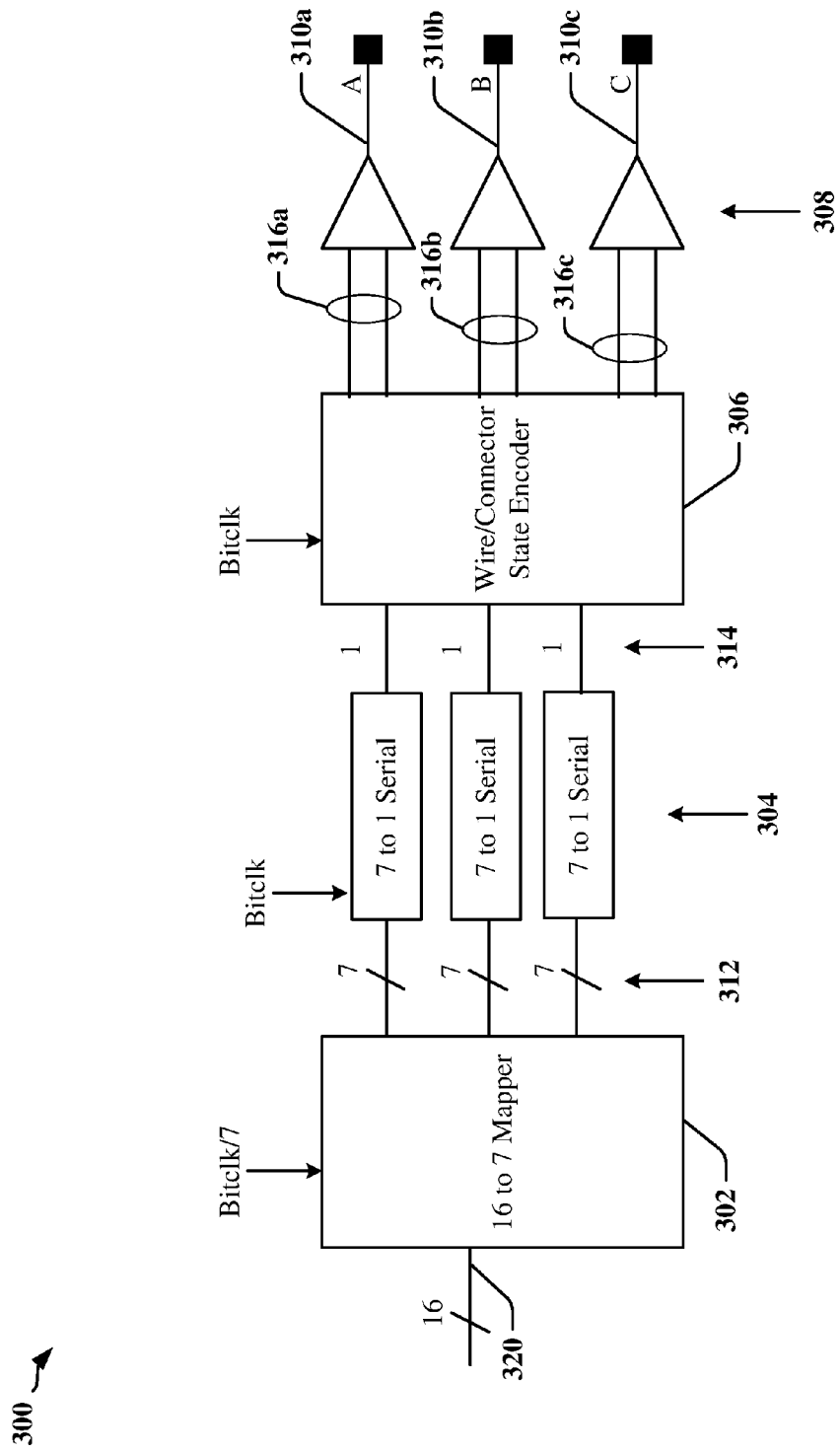
FIG. 3 illustrates an N-phase polarity data encoder.

FIG. 3 is a schematic diagram illustrating an M-wire, N-phase polarity encoder 300 that may be used to implement certain aspects of the communication link 220 depicted in FIG. 2. In the example depicted, the M-wire, N-phase polarity encoder transmitter is configured to transmit information using M=3 wires and N=3 phase signaling. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders and decoders.

Signaling states defined for each of the M wires in an M-wire, N-phase polarity encoding scheme may include an undriven state, a positively driven state and a negatively driven state. In the 3-wire, 3-phase polarity encoding scheme, the positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. In one example, the undriven state may be realized by placing an output of a driver of a signal wire 310a, 310b or 310c in a high-impedance mode. In another example, the undriven state may be obtained on a signal wire 310a, 310b or 310c by passively or actively causing an "undriven" signal wire 310a, 310b or 310c to assume a voltage level that lies substantially halfway between positive and negative voltage levels provided on driven signal wires 310a, 310b and/or 310c. Typically, no significant current flows through an undriven signal wire 310a, 310b or 310c. Signaling states defined for a 3-wire, 3-phase polarity encoding scheme may be denoted using the three signaling states $\{+1, 0, -1\}$, which may represent voltage or current states. In one example, the three states $\{+1, 0, -1\}$ may signify the three voltage levels +V, 0, -V. In another example, the three states $\{+1, 0, -1\}$ may signify the three voltage levels +V, +V/2, 0. In another example, the three states $\{+1, 0, -1\}$ may signify currents of I, 0, -I.

A 3-wire, 3-phase, polarity encoder may employ a set of drivers 308 to control the signaling state of connectors 310a, 310b and 310c. The drivers 308 may be implemented as unit-level current-mode or voltage-mode drivers. Each driver 308 may receive a set of signals 316a, 316b or 316c that determines the signaling state of corresponding connector 310a, 310b or 310c. In the example depicted, each of the drivers 308 receives a pair of signals 316a, 316b or 316c that defines four states for the corresponding connector 310a, 310b or 310c. In another example, each driver 308 may receive a set of three signals defining 8 states for the corresponding connector 310a, 310b, or 310c.

For each transmitted symbol interval in an M-wire, N-phase polarity encoding scheme, at least one signal wire 310a, 310b or 310c is in the undriven state (0 signaling state), while the number of positively driven (+1 signaling state) signal wires 310a, 310b or 310c is equal to the number of negatively driven (−1 signaling state) signal wires 310a, 310b or 310c, such that the sum of current flowing to the receiver is zero. At each symbol transition, between the previously transmitted symbol and a next transmitted symbol, the signaling state of at least one signal wire 310a, 310b or 310c changes. When the signaling state of at least one signal wire 310a, 310b and/or 310c changes between each pair of consecutive symbols, a receiver can reliably generate a receive clock based on the transitions.

In operation, a mapper 302 may receive and map input data 320 to a set of symbols 312. In the depicted 3-wire, 3-phase example, the set of symbols includes seven 3-bit symbols, and a 16-bit word of the input data 320 may be encoded in each set of symbols. Each bit of a 3-bit symbol defines the state of one of the signal wires 310a, 310b and 310c for one symbol interval. The sequence of symbols 312 may be serialized using parallel-to-serial converters 304 that provide a timed sequence of symbols 314, each symbol defining the signaling state of the 3-wires 310a, 310b and 310c. The sequence of symbols 314 is typically timed using a transmission clock to delineate symbol intervals, whereby a single symbol is transmitted in each symbol interval. A 3-wire phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols. A non-integer number of data bits may be encoded in each symbol. In the example of a 3-wire, 3-phase system, there are 3 available combinations of 2 wires that may be driven simultaneously, and 2 possible combinations of polarity on the pair of wires that is driven, yielding 6 possible states. The signaling state of the signal wires 310a, 310b and 310c changes at each transition between symbols and, accordingly, 5 of the 6 states are available at every transition. In other words, the state of at least one wire changes at each transition to permit a receiver to generate a reliable receive clock and, given a current signaling state, there are five possible signaling states available at each transition. With 5 states, $\log_2(5) \square$ 2.32 bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 binary bits.

Figure 4:
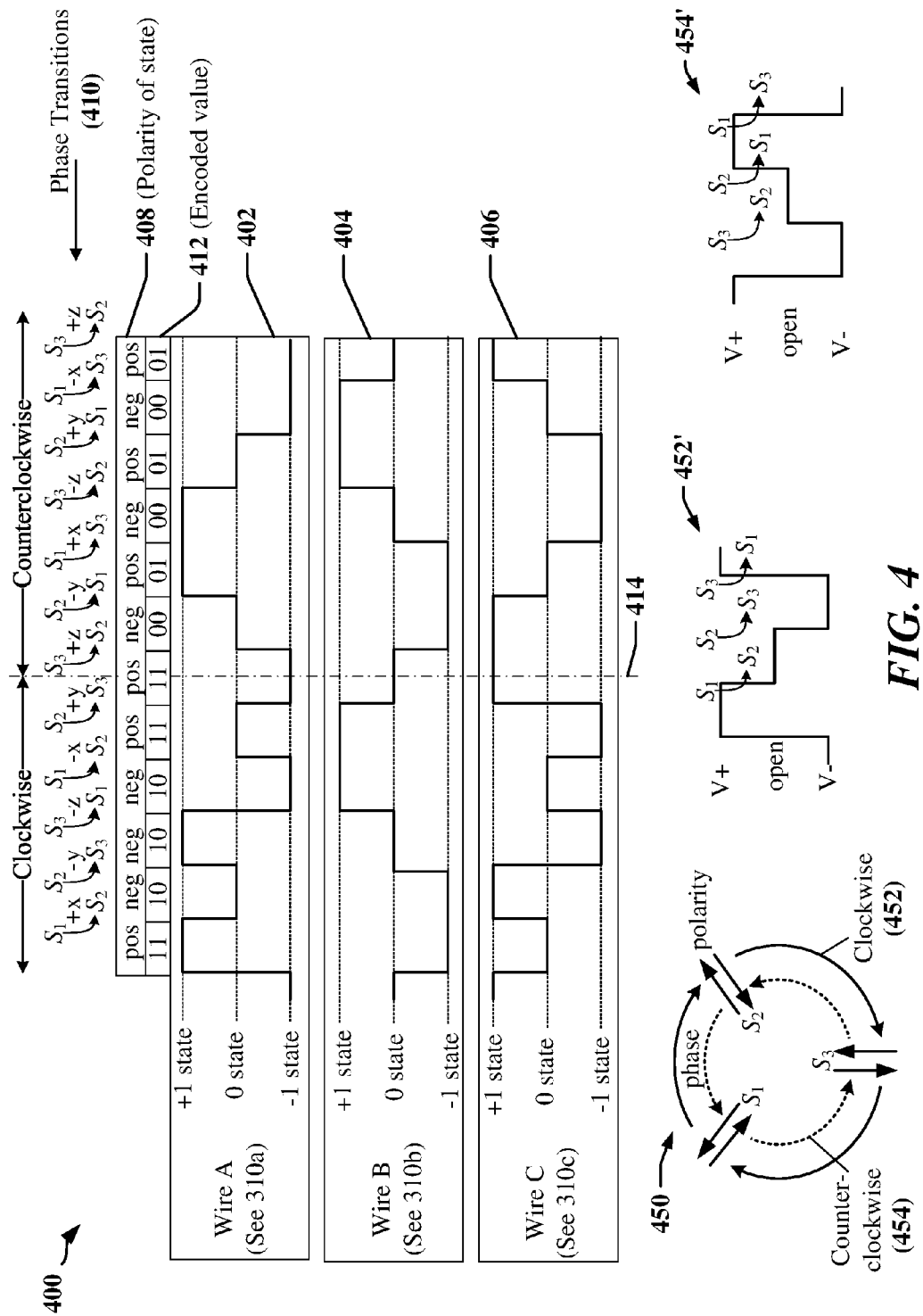
FIG. 4 illustrates signaling in an N-phase polarity encoded interface.

FIG. 4 is a diagram that includes an example of a timing chart 400 for signals encoded using a three-phase modulation data-encoding scheme, which is illustrated by the circular state diagram 450. Information may be encoded in a sequence of signaling states where, for example, a wire or connector is in one of three phase states $S_1$, $S_2$ and $S_3$ defined by the state diagram 450. Each state may be separated from the other states by a 120° phase shift. In one example, data may be encoded in the direction of rotation of phase states on the wire or connector. The phase states in a signal may rotate in clockwise direction 452, 452' or counterclockwise direction 454, 454'. In the clockwise direction 452, 452' for example, the phase states may advance in a sequence that includes one or more of the transitions from $S_1$ to $S_2$, from $S_2$ to $S_3$ and from $S_3$ to $S_1$. In the counterclockwise direction 454, 454', the phase states may advance in a sequence that includes one or more of the transitions from $S_1$ to $S_3$, from $S_3$ to $S_2$ and from $S_2$ to $S_1$. The three wires 310a, 310b and 310c carry different phase-shifted versions of the same signal, where the versions are phase shifted by 120° with respect to one another. Each signaling state may be represented as a different voltage level on a wire or connector and/or a direction of current flow through the wire or connector. During each of the sequence of signaling states in a 3-wire system, each wire 310a, 310b and 310c is in a different signaling states than the other wires. When more than 3 wires 310a, 310b and 310c are used in a 3-phase encoding system, two or more wires 310a, 310b and/or 310c can be in the same signaling state at each signaling interval, although each state is present on at least one wire 310a, 310b and/or 310c in every signaling interval.

Information may be encoded in the direction of rotation at each phase transition 410, and the 3-phase signal may change direction for each signaling state. Direction of rotation may be determined by considering which wires 310a, 310b and/or 310c are in the '0' state (e.g., the undriven state) before and after a phase transition, because the undriven wire 310a, 310b and/or 310c changes at every signaling state in a rotating three-phase signal, regardless of the direction of rotation.

The encoding scheme may also encode information in the polarity 408 of the two of the conductors 310a, 310b and 310c that are actively driven. At any time in a 3-wire implementation, exactly two of the conductors 310a, 310b, 310c are driven with currents in opposite directions and/or with a voltage differential. In a simple implementation, data may be encoded using two bit values 412, where one bit is encoded in the direction of phase transitions 410 and the second bit is encoded in the polarity 408 of the current state.

The timing chart 400 illustrates data encoding using both phase rotation direction and polarity. The curves 402, 404 and 406 relate to signals carried on three wires 310a, 310b and 310c, respectively for multiple phase states. Initially, the phase transitions 410 are in a clockwise direction and the most significant bit is set to binary '1,' until the rotation of phase transitions 410 switches at a time 414 to a counter-clockwise direction, as represented by a binary '0' of the most significant bit. The least significant bit reflects the polarity 408 of the signal in each state.

In some instances, the encoding scheme may encode information in changes in the polarity 408 of the two actively driven conductors 310a, 310b and/or 310c. In one example, a bit having a value of "1" may be encoded as a change in polarity 408 between two symbol intervals, while a bit having a value of "0" may be encoded as no change in polarity 408 between the two symbol intervals. A decoder may be configured to decode data at the boundaries between symbols by detecting changes in direction of rotation and changes in polarity. If data is encoded in changes in polarity between two symbol intervals in the example of FIG. 4, the depicted sequence of encoded bit values 412 can be replaced by the sequence {11, 10, 10, 11, 10, 01, 01, 01, 01, 01, 01, 01}.

According to certain aspects disclosed herein, one bit of data may be encoded in the rotation or phase change in a 3-wire, 3-phase encoding system, and an additional bit may be encoded in the polarity of the two driven wires or in a change in polarity of the driven wires compared to the polarity used in the previous wire state. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available for transition from any current state. Accordingly, there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6,4) = \frac{6!}{(6-4)! \cdot 4!} = 15$$

possible combinations of actively driven wires, with:

$$C(4,2) = \frac{4!}{(4-2)! \cdot 2!} = 6$$

different combinations of polarity for each phase state.

The 15 different combinations of actively driven wires may include:

| A B C D | A B C E | A B C F | A B D E | A B D F |
|---------|---------|---------|---------|---------|
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| ++ − − | + − − + | + − + − | − + − + | − + + − | − − + + |
|--------|---------|---------|---------|---------|---------|

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

Figure 5:
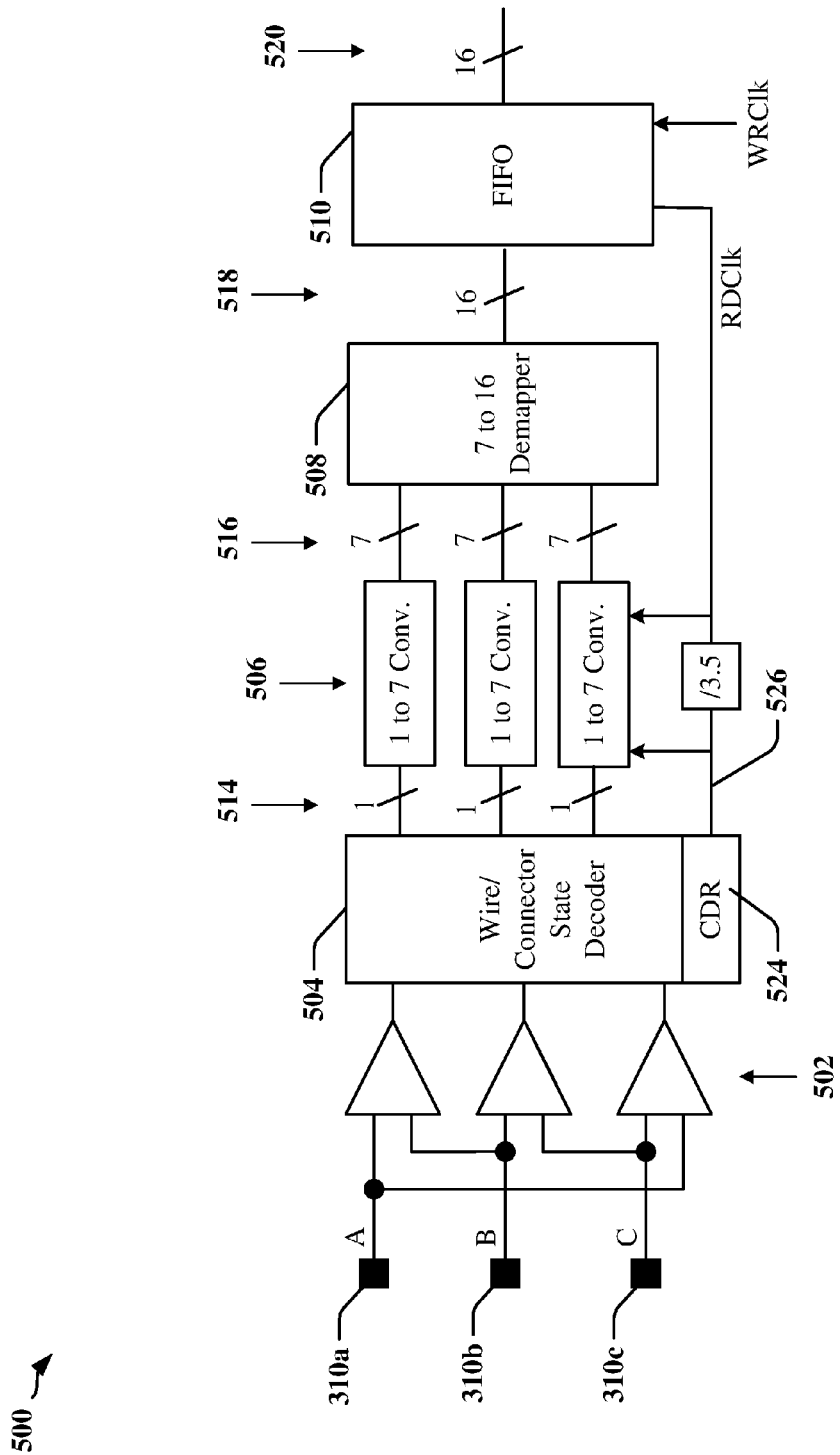
FIG. 5 illustrates an N-phase polarity decoder.

FIG. 5 is a diagram illustrating certain aspects of a 3-wire, 3-phase decoder 500. Differential receivers 502 and a wire state decoder 504 are configured to provide a digital representation of the state of the three signal wires 310a, 310b and 310c, with respect to one another, and to detect changes in the signaling state of the three signal wires 310a, 310b and 310c compared to the signaling state of the three signal wires 310a, 310b and 310c in the preceding symbol period. The digital representation of the signaling state of the three signal wires 310a, 310b and 310c during a symbol period may be referred to as a raw symbol. A sequence of seven consecutive raw symbols 514 are assembled by serial to parallel convertors 506 to obtain a set of 7 symbols 516 to be processed by demapper 508. The demapper 508 produces 16 bits of output data 518 that may be buffered in a first-in-first-out (FIFO) device 510 to provide output data 520.

In operation, the wire state decoder 504 may extract a sequence of symbols 514 from signals received on wires 310a, 310b and 310c. The symbols 514 are decoded based on signaling states that may be represented as a combination of phase rotation and polarity, or changes in polarity, of the signals received on wires 310a, 310b and 310c, as disclosed herein. The wire state decoder may include a CDR circuit 524, which extracts a clock 526 that can be used to reliably capture symbols from the wires 310a, 310b and 310c. The CDR circuit 524 may be configured to generate the clock 526 based on the occurrence of a transition on least one of the wires 310a, 310b and/or 310c at each boundary between consecutive symbol intervals. The CDR circuit 524 may delay an edge of the clock 526 to allow time for all wires 310a, 310b and 310c to stabilize and to thereby ensure that the current symbol can be reliably captured for decoding purposes.

The delay used by the CDR circuit 524 may be configured to allow a period of time sufficient to mask the effect of multiple edges at the same symbol boundary, where the multiple edges are generated at different times by different ones of the differential receivers 502. These multiple edges can arise when certain state transitions cause different differential receivers 502 to produce edges that may be separated in time with respect to one another. The CDR circuit 524 may include a delay element that delays response to a first occurring edge at a symbol boundary until a time when all possible edges have occurred. Variations in the performance of components of the CDR circuit 524 may be expected to affect the delays between multiple edges. These variations in performance of components in the CDR circuit 524 may be accommodated by configuring a delay for the CDR circuit 524 that accounts for worst-case conditions. The variations in performance may be caused by changes in power, voltage and thermal (PVT) conditions, for example. The duration of the delay may affect the performance of the communications link and may limit the maximum clock frequency that can be used in the communications link. If the configured delay is too short, then multiple clock pulses may be created for a single symbol, which may cause loss of synchronization between transmitter and receiver. If the delay is too long, symbol times may overlap, thereby causing the clock recovery circuit to malfunction or generate a single pulse for two symbol intervals.

Figure 6:
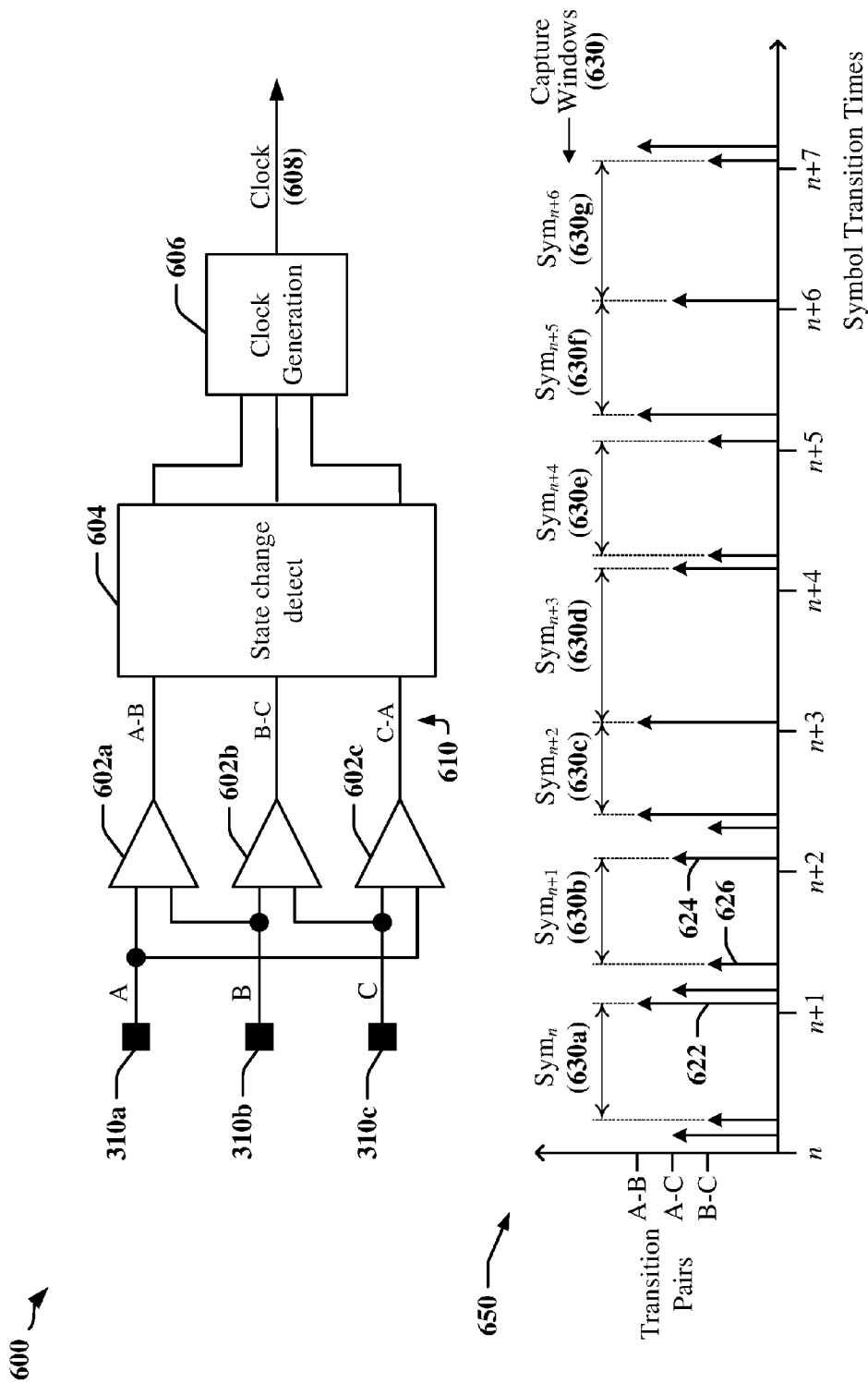
FIG. 6 illustrates transition detection in an M-wire N-phase polarity decoder.

FIG. 6 includes a block schematic diagram 600 illustrating certain aspects of clock generation in a 3-wire, 3-phase decoder. A set of differential receivers 602a, 602b and 602c compares the signaling state of each of the three signal wires 310a, 310b and 310c with the signaling states of the other of the three wires 310a, 310b and 310c. In the example depicted, a first differential receiver 602a compares the signaling states of wires 310a and 310b, a second differential receiver 602b compares the states of wires 310b and 310c and a third differential receiver 602c compares the states of wires 310a and 310c. As described herein, signaling state of at least one of the wires 310a, 310b and 310c changes at each symbol boundary. Accordingly, a state change detection circuit 604 can detect the occurrence of a change in signaling state when the output of at least one of the differential receivers 602a, 602b and 602c changes at the end of each symbol interval.

Certain signaling state transitions may be detectable by a single differential receiver 602a, 602b or 602c, while other signaling state transitions may be detected by two or more of the differential receivers 602a, 602b and/or 602c. In one example, the signaling states or relative states of two wires may be unchanged after a symbol transition, and the output of a corresponding differential receiver 602a, 602b or 602c may also be unchanged after the symbol transition. In another example, both wires in a pair of wires 310a, 310b and/or 310c may be in the same first state in a first time interval and both wires may be in a same second state in a second time interval, such that the output of a corresponding differential receiver 602a, 602b or 602c may be unchanged after the phase transition. Accordingly, a clock generation circuit 606 may include signaling state change detect circuits and logic 604 that monitor the outputs of all differential receivers 602a, 602b and 602c in order to determine when a signaling state transition has occurred. The clock generation circuit may generate a receive clock signal 608 based on detected signaling state transitions.

Changes in signaling states on different wires 310a, 310b and/or 310c may occur or be detected at different times. The timing of detection of the signaling state changes may vary according to the type of signaling state change that has occurred. The result of this variability is illustrated in the simplified timing diagram 650 provided in FIG. 6. Markers 622, 624 and 626 representing the outputs of the signaling state change detection circuit 604 and/or differential receivers 602a, 602b and 602c are assigned different heights for clarity of illustration only. The relative heights of markers 622, 624 and 626 have no specific relationship to voltage or current levels, polarity or weighting values used for clock generation or data decoding. The timing diagram 650 illustrates the effect of timing of transitions associated with symbols transmitted on the three wires 310a, 310b and 310c. In the timing diagram 650, transitions between some symbols may result in variable capture windows 630a, 630b, 630c, 630d, 630e, 630f and/or 630g (collectively, the symbol capture windows 630) during which symbols may be reliably captured. The number of signaling state changes detected and their relative timing can result in jitter on the clock signal 608.

Figure 7:
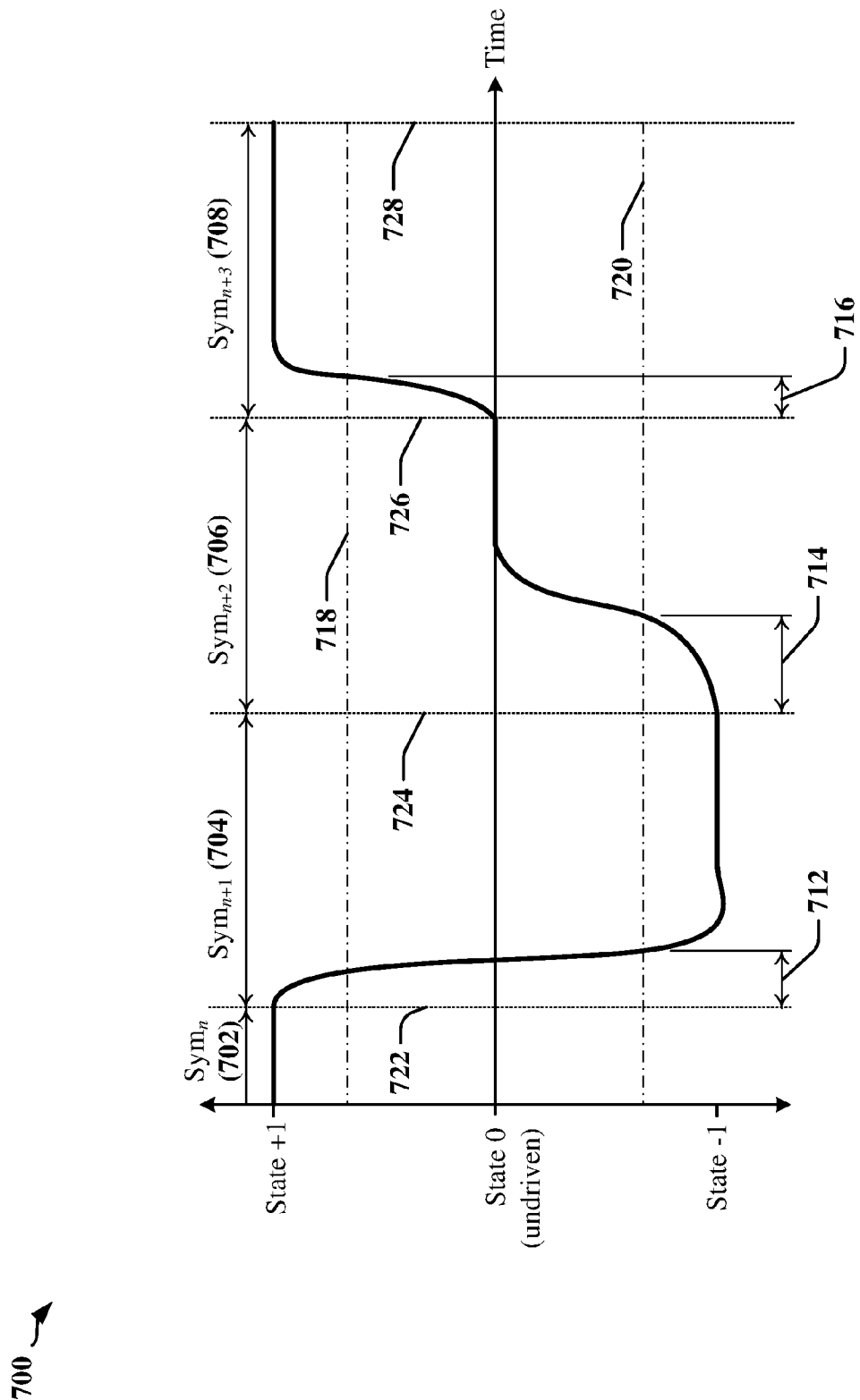
FIG. 7 is a simplified example of the effects of signal rise times on transition detection in an M-wire N-phase polarity decoder.

Variability in the sizes of the symbol windows 630, and associated jitter, may be caused in part by the electrical characteristics of the wires 310a, 310b and 310c, as illustrated in the simple example 700 depicted in FIG. 7. Transition times may be affected by variability in signal rise or fall times and/or variability in detection circuits caused by manufacturing process tolerances, variations and stability of voltage and current sources and operating temperature. Large variability in transition times may be attributable to the existence of different voltage or current levels in 3-phase signaling. A simplified "voltage-level" example is depicted in FIG. 7, which illustrates transition times in a single wire 310a, 310b or 310c. A first symbol ($Sym_n$) 702 may be transmitted in a symbol interval that ends at time 722, a second symbol ($Sym_{n+1}$) may be transmitted in a symbol interval that ends at time 724 and a third symbol ($Sym_{n+2}$) 706 may be transmitted in a symbol interval that ends at time 726, when transmission of a fourth symbol ($Sym_{n+3}$) 708 begins. The transition from a state determined by the first symbol 702 to the state corresponding to the second symbol 704 may be detected after a first delay 712 attributable to the time taken for voltage in the wire 310a, 310b or 310c to reach a threshold voltage 718 and/or 720. The threshold voltages may be used to determine the state of the wire 310a, 310b or 310c. The transition from a state determined by the second symbol 704 to the state for the third symbol 706 may be detected after a second delay 714 attributable to the time taken for voltage in the wire 310a, 310b or 310c to reach one of the threshold voltages 718 and/or 720. The transition from a state determined by the third symbol 706 to the state for the fourth symbol 708 may be detected after a third delay 716 attributable to the time taken for voltage in the wire 310a, 310b or 310c to reach a threshold voltage 718 and/or 720.

As depicted, the third delay 716 may be shorter than the first delay 712, and the second delay 714 may be the longest delay. The second delay 714 may be the longest delay because state 0 is an undriven state and the voltage in the wire 310a, 310b or 310c may drift slowly towards the threshold 720, whereas the first delay 712 and the third delay 716 are associated with transitions in which the wire 310a, 310b or 310c is actively pulled to the −1 and +1 states, respectively.

Figure 8:
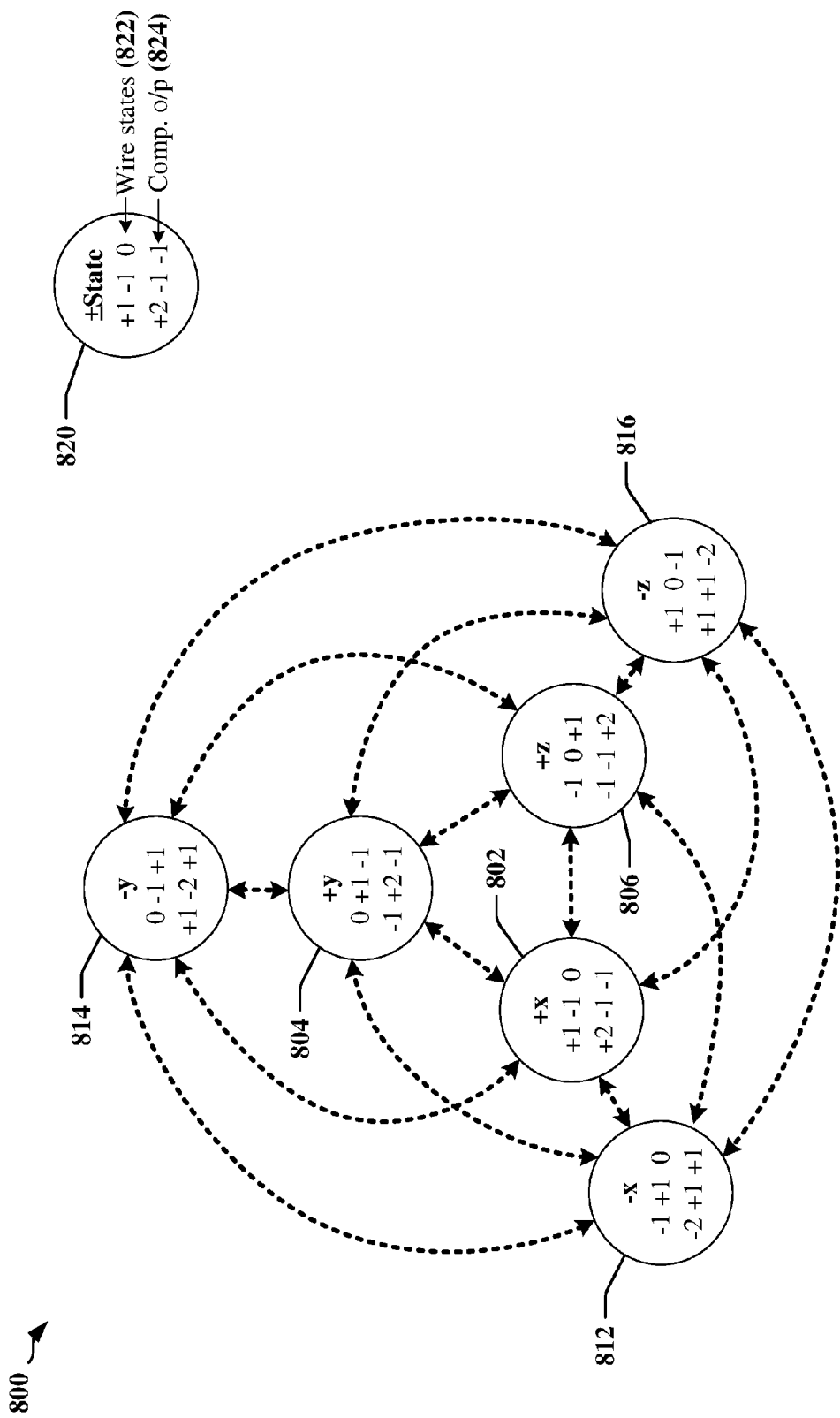
FIG. 8 is a state diagram illustrating potential state transitions in an M-wire N-phase polarity decoder.

FIG. 8 is a state diagram 800 illustrating 6 possible phase-polarity states and 30 possible state transitions in one example of a 3-wire, 3-phase communication link. The possible states 802, 804, 806, 812, 814 and 816 in the state diagram 800 include the states shown in the state diagram 450 of FIG. 4. As shown in the example state element 820, each state 802, 804, 806, 812, 814 and 816 in the state diagram 800 includes a field 822 showing the signaling state of signals A, B and C (transmitted on wires 310a, 310b and 310c respectively), and a field 824 showing the result of a subtraction of wire voltages by differential receivers (such as the differential receivers 602a, 602b, 602c depicted in FIG. 6). For example, in state 802 (+x) wire A=+1, wire B=−1 and wire C=0, yielding output of differential receiver 602a (A−B)=+2, differential receiver 602b (B−C)=−1 and differential receiver 602c (C−A)=+1. As illustrated by the state diagram, transition decisions taken by the state change detect circuit 604 are based on 5 possible levels produced by differential receivers 602a, 602b and 602c, which include −2, −1, 0, +1 and +2 voltage states.

Figure 9:
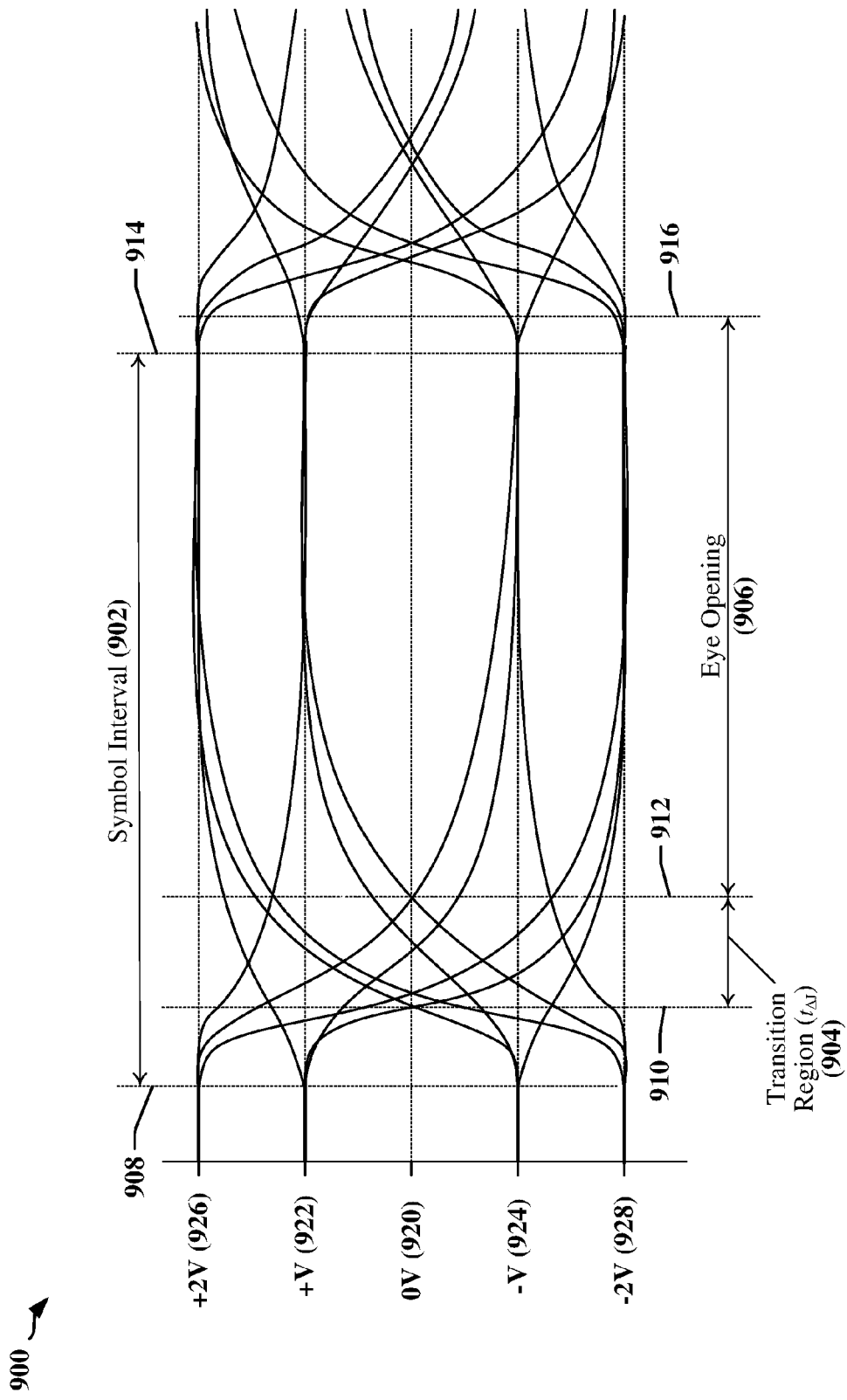
FIG. 9 is a diagram illustrating transition and eye regions in an M-wire N-phase polarity decoder.

FIG. 9 is a diagram showing simplified eye chart that may be generated from an overlay of multiple symbol intervals 902. A signal transition region 904 represents a time period of uncertainty where variable signal rise times prevent reliable decoding. State information may be determined in an "eye opening" 906 representing the time period in which the symbol is stable and can be reliably received and decoded. In one example, the eye opening 906 may be determined to begin at the end 912 of the signal transition region 904, and end at the termination (symbol boundary 914) of the symbol interval 902. In the example depicted in FIG. 9, the eye opening 906 may be determined to begin at the end 912 of the signal transition region 904, and end at a time when the signaling state of the connectors 310a, 310b, 310c and/or the outputs of the three differential receivers 602a, 602b and 602c have begun to change to reflect the next symbol.

The maximum speed of the communication link 220 configured for N-Phase encoding may be limited by the duration of the signal transition region 904 compared to the received signal eye opening 906. The minimum period for the symbol interval 902 may be constrained by tightened design margins associated with the CDR circuit 524 in the decoder 500 illustrated in FIG. 5, or in the clock generation circuit 606 of FIG. 6, for example. Different signaling state transitions may be associated with different variations in signal transition times corresponding to two or more wires 310a, 310b and/or 310c, thereby causing the outputs of the differential receivers 602a, 602b and 602c in the receiving device to change at different times and/or rates with respect to the symbol boundary 908, where the inputs to the differential receivers 602a, 602b and 602c begin to change. The large potential differences in received signal transition times between the outputs of multiple differential receivers 602a, 602b and 602c in the receiving device typically requires the implementation of a delay element in the CDR circuit 524. The delay element may have a minimum delay period that exceeds the transition region time 904. In one example, a delay element may be provided in one or more of the state change detect circuit 604 and/or the clock generation circuit 606 shown in FIG. 6. The maximum delay time provided by this delay element may not extend beyond the closing edge 916 of the eye opening 906. In some instances, the maximum delay time provided by the delay element may not extend beyond the commencement of the next symbol interval at time corresponding to the symbol boundary 914. At faster data rates, the eye opening 906 can become small in comparison to the symbol interval 902 and the effect of symbol transition variability may be determinative of the maximum symbol transmission rate.

The duration of any single transition is unlikely to span the full range of the signal transition region ($t_{\Delta r}$) 904, since it is unlikely that a minimum possible signal transition time and a maximum possible transition time occurs during a single symbol transition. In one example, the signal transition region 904 may be bounded by the time of the first zero crossing 910 detected at the output of a differential receiver 602a, 602b, or 602c and the time of the last zero crossing marking the end 912 of the signal transition region 904 and detected at the output of a differential receiver 602a, 602b, or 602c, for all possible symbol transitions. The transition times observed at the outputs of the differential receiver 602a, 602b, and 602c may correspond to the times taken for the connectors and/or wires 310a, 310b or 310c to reach a next state after the input to a driver 308 of the connector and/or wire 310a, 310b or 310c. The longest possible transition time may be determined based on the characteristics of the signal wire and/or connector 310a, 310b or 310c and the type of state transition involved. In one example, the longest possible transition time may be determined by the rise or fall time of one or more signals. Rise and fall times may be determined by the nature and voltage levels of the original and/or the final states. Typically, the longest possible transition time corresponds to a transition between an actively driven state and an undriven state.

A high value of $t_{\Delta f}$ for the transition region 904 can result in increased design difficulty associated with the CDR circuit 524 or clock generation circuit 606. For example, the clock generation circuit 606 may employ a delay element or timer that is triggered by the first zero crossing of the signals 610 output by the three differential receivers 602a, 602b and 602c. The state of the outputs of all three differential receivers 602a, 602b and 602c may not be safely sampled until all of the differential receivers 602a, 602b and 602c have reached their final state, which may be defined by the eye opening 906. Accordingly, the timer may preferably expire shortly after the end 912 of the transition region 904, at which time clock generation circuit 606 may output a clock edge that is used to sample the outputs of the three differential receivers 602a, 602b and 602c.

In some devices, delay elements in the CDR circuit 524 can be afflicted by variations in manufacturing process, circuit supply voltage, and die temperature (PVT variation), and may generate delays that vary significantly. In such systems, the nominal operating condition of the CDR circuit 524 is generally set by design to generate a clock edge somewhere in the middle of the eye opening 906 in order to ensure that a clock edge occurs after the end 912 of the transition region 904 and prior to the commencement of the transition region to the next symbol (i.e., the closing edge 916 of the eye opening 906), even under worst case PVT effects. Difficulty can arise in designing a CDR circuit 524 that guarantees a clock edge within the eye opening 906 when the transition region 904 is large compared to the eye opening 906. For example, a typical delay element may produce a delay value that changes by a factor of 2 over all PVT conditions, and the eye opening 906 must be larger than the transition region 904 in order that a non-adjustable delay value can be chosen.

In some instances, the duration of the transition region 904 may be calculated based on the maximum timing between a change in input to one or more drivers 308 of a transmitting circuit (see FIG. 3) and corresponding transitions observed or expected at the outputs of differential receivers 502 in a receiver (see FIG. 5). In other instances, a modified transition region may be determined at the outputs of the receivers 502 as the maximum difference between the time 918 of a first transition at the output of one of the receivers 502 and the time corresponding to the symbol boundary 914 of the last transition at the output of the other receivers 502, for all symbol transitions.

According to certain aspects disclosed herein, an encoder may be adapted to minimize the proportion of the symbol interval 902 occupied by the transition region 904 and maximize the proportion of the symbol interval 902 occupied by the eye opening 906. In one example, the timing of signaling state transitions on one or more signal wires 310a, 310b and/or 310c (see FIG. 3) may be modified at or prior to the occurrence of a symbol boundary 908, 914 for certain symbol transitions. In an encoder 300, for example, prior knowledge of the specific N-Phase symbol states 802, 804, 806, 812, 814 or 816 (a priori state knowledge) in consecutive symbols may be used to predict whether the timing of one or more N-Phase driver outputs should be adjusted at the symbol boundary 908, 914 between the consecutive symbols. The manner of adjustment may also be determined based on the a priori state knowledge. The adjustments may affect the output of one or more of the drivers 308, and adjustments may be made on a symbol-by-symbol basis. The adjustments may include advancing or delaying certain driver output signal transitions. In some instances, the adjustments may include selective addition of pre-emphasis to certain driver outputs at certain types of symbol transitions, based on prior knowledge of which transition will occur (a priori transition knowledge). As a result, edges output from the differential receivers 602a, 602b and 602c in the receiving device may be more precisely aligned with respect to time.

The a priori transition knowledge may include information that characterizes the response of connectors to state transitions. Such information may be obtained from models of the connectors, drivers and receivers and by simulating the response of the communications links to various types of transitions using the models. In some instances, the a priori transition knowledge may include empirical information obtained from tests preformed on physical devices and communication links. The a priori transition knowledge may be calibrated based on differences between simulated and measured results. The a priori transition knowledge may include empirical information provided by a receiver during system operation.

According to certain aspects, smaller variations between transition times on the signal wires 310a, 310b and 310c and/or at the outputs of the differential receivers 602a, 602b and 602c may provide significantly greater design margins when the proportion of the symbol interval 902 occupied by the transition region 904 is minimized. In one example, a CDR circuit 524 may benefit from larger timing tolerances afforded one or more delay elements used in the CDR circuit 524. In another example, the maximum symbol transmission rate of the M-Wire N-Phase communications link 220 may be significantly increased when the proportion of the symbol interval 902 occupied by the transition region 904 is minimized and the proportion of the symbol interval 902 occupied by the eye opening 906 is maximized.

According to certain aspects of this disclosure, variations of the transition region 904 may be significantly reduced at the transmitter by considering each symbol transition individually, and selectively delaying or advancing a transition on one or more signal wire. In some instances, detection circuitry in the transmitter may be adapted to determine anticipated or calculated transition times associated with a symbol transition. In one example, the transmitter may determine whether the duration of transition region 904 exceeds a predetermined maximum or threshold period. If the transition region 904 exceeds the maximum or threshold period, then one or more signals may be advanced or delayed to reduce the transition region 904 at the receiver for the symbol transition. The maximum or threshold period may be determined based on a specified or desired symbol transmission rate, tolerances of the CDR circuit 524 and/or tolerances defined for other circuits in the transmitter or receiver. The maximum or threshold period may be defined to obtain a specified or desired minimum duration of the eye opening 906. The maximum or threshold period may be defined to minimize jitter in a receive clock derived from the transmitted signals. The transition region 904 may be significantly reduced when one or more signals may be advanced or delayed.

Figure 10:
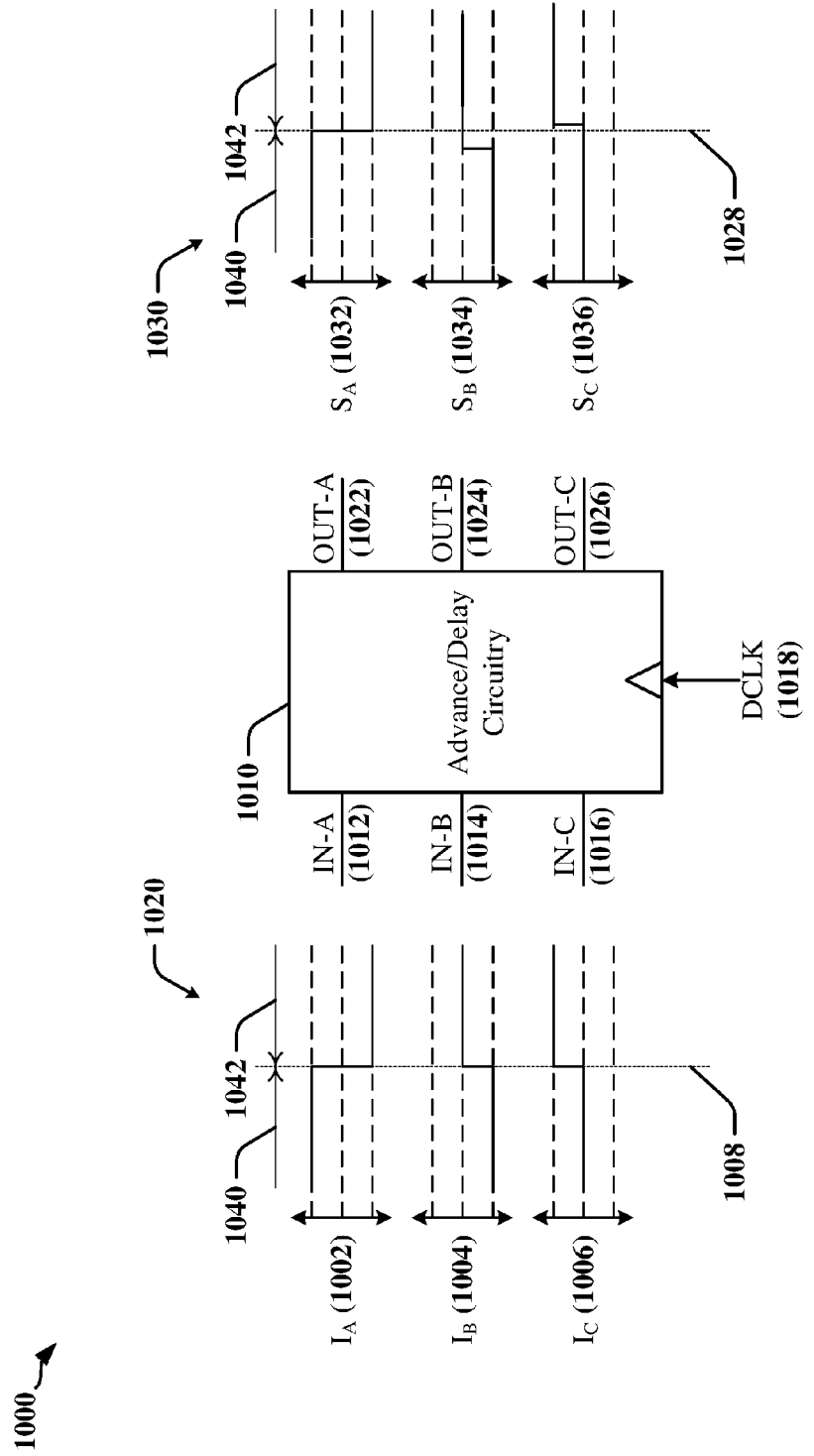
FIG. 10 is a simplified diagram illustrating certain aspects of transition advancement and delay according to certain aspects disclosed herein.

FIG. 10 is a simplified diagram 1000 illustrating certain aspects of transition advancement and delay according to certain aspects disclosed herein. The example depicts three input signals 1002, 1004 and 1006, but it will be appreciated that the concepts described in relation to FIG. 10 apply equally to other communications interfaces that transmit symbols on more than three signal wires or connectors. A transmitter may include a module or circuit 1010 that may be configured to advance and/or delay one or more signals 1002, 1004, 1006 to obtain a set of signals 1032, 1034, 1036 that are calculated to produce a minimized transition region at the outputs of differential receivers (or other receivers) in a receiving device. In one example, one or more signals may be advanced or delayed at the transmitter in order to cause the transition detection signals 610 output by the differential receivers 602a, 602b and 602c to be temporally aligned (see FIG. 6, and see timing diagram 650 in FIG. 6). The signals 610 may be temporally aligned when corresponding edges in the signals 610 occur within a predefined maximum or threshold alignment period. The maximum or threshold alignment period may be determined based on a specified or desired symbol transmission rate, tolerances of the CDR circuit 524 and/or tolerances defined for other circuits in the receiver. The maximum or threshold alignment period may be defined to obtain a specified or desired minimum duration of the eye opening 906. The maximum or threshold alignment period may be defined to minimize jitter in a receive clock 526.

In the example, three signals 1002, 1004, 1006 are provided to corresponding input signals 1012, 1014, 1016 of circuitry 1010, which is configured to selectively advance and/or delay one or more of the signals 1002, 1004, 1006, and to produce output signals 1032, 1034, 1036 at the outputs 1022, 1024, 1026. As shown in the input timing diagram 1020, the depicted input signals 1002, 1004, 1006 include a transition 1008 between two symbol intervals 1040 and 1042. In the first symbol interval 1040, the signals 1002, 1004, 1006 correspond to a "+x" symbol 802 having a value of {+1, −1, 0} (see FIG. 8). In the second symbol interval 1042, the signals 1002, 1004, 1006 correspond to a "+z" symbol 806 having a value of {−1, 0, +1}. For illustrative purposes only, it may be assumed that transitions between the "0" signaling state and the "+1" or "−1" signaling states are the fastest transitions, while a transition to the "0" signaling state is the slowest transition. In some instances, the relative speeds of transitions between the signaling states may be different.

The advance/delay circuitry 1010 may be configured to advance the slowest transitioning signal and/or delay the fastest transitioning signal such that the receiver generates transitions within a shortened transition interval. In this example, the advance/delay circuitry 1010 may determine that a transition on the third signal 1006 is likely to produce the fastest transition detection at the receiver, a transition on the second signal 1004 is likely to produce the slowest transition detection at the receiver, and a transition on the first signal 1002 is likely to produce neither the fastest nor the slowest transition detection at the receiver. In one example, the advance/delay circuitry 1010 may provide output signals 1032, 1034, 1036 which are versions of the three input signals 1002, 1004, 1006 and in which the transition in the second signal 1034 is advanced with respect to the symbol transition 1028, and the third signal is delayed with respect to the symbol transition 1028. In some instances, the transition in the first signal 1032 may be delayed or advanced such that the transitions on all output signals 1032, 1034, 1036 produce transition detections at the receiver that are closely aligned to an edge of a symbol clock. In other instances, at least one of the three output signals 1032, 1034, and/or 1036 is neither delayed nor advanced, and advancements or delays applied to the other output signals 1032, 1034, 1036 are calculated to obtain alignment of transition detections without regard to the symbol clock used by the receiver. That is to say, one or more of the signals 1032, 1034, 1036 transmitted to the receiver may be advanced and/or delayed with respect to the other signals 1032, 1034, 1036 such that the edges may be more closely aligned when received by the differential receivers 602a, 602b and 602c. The decision to advance or retard certain outputs may be based on the states of the raw symbol values before and after the symbol transition.

Figure 11:
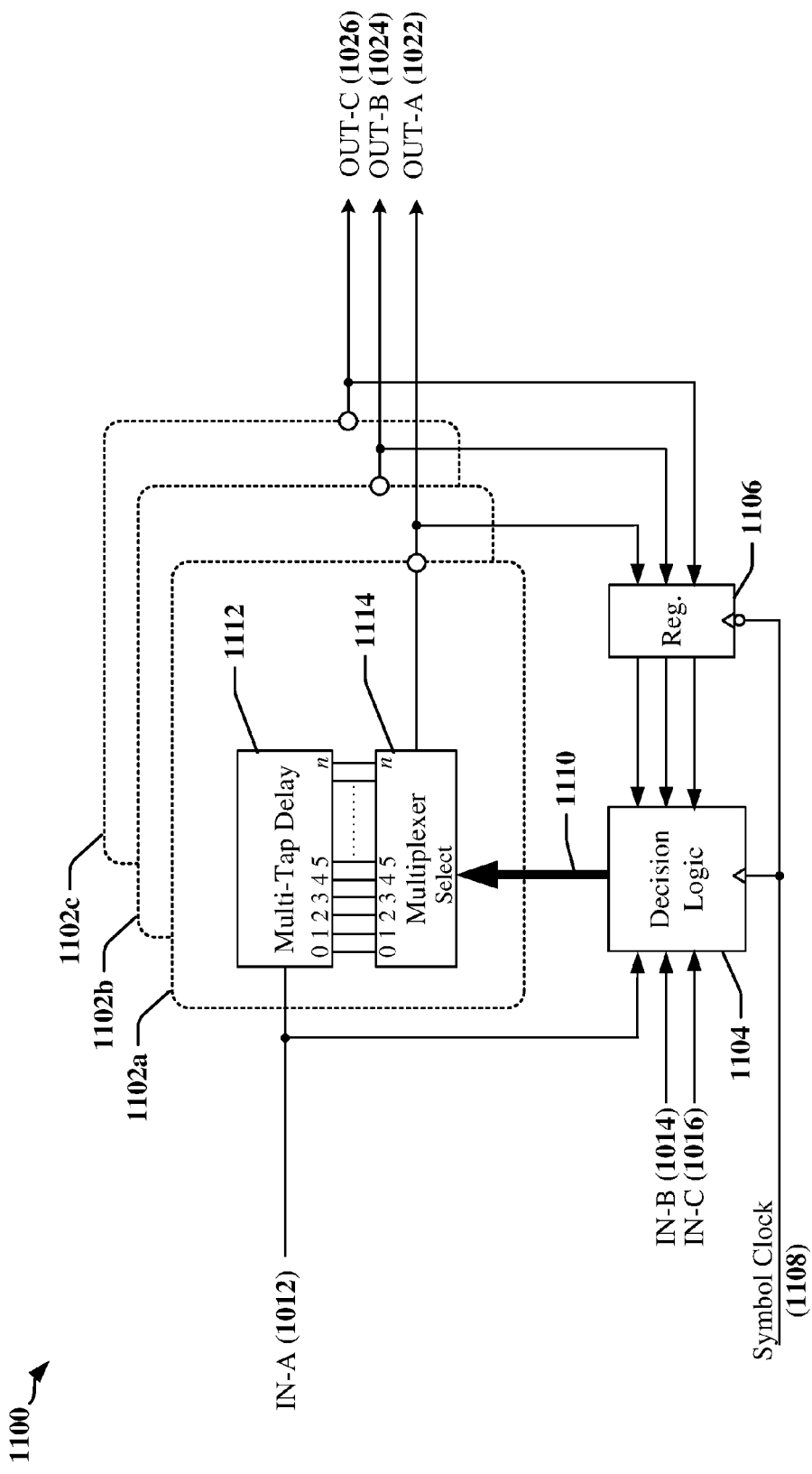
FIG. 11 is a diagram illustrating one example of an advance/delay circuit for signals transmitted on a multi-wire interface according to certain aspects disclosed herein.

FIG. 11 is a block diagram illustrating an example of an advance/delay circuit 1100 that may be used for input signals 1012, 1014, and 1016 to be transmitted on a multi-wire interface. The advance/delay circuit 1100 may be included in the advance/delay circuitry 1010 of FIG. 10. Each of the input signals 1012, 1014, and 1016 is processed through a delay cell 1002a, 1002b, and 1002c, respectively. In one example, each delay cell 1002a, 1002b, and 1002c may be operated to apply an integer number of unit delay periods to the corresponding input signal 1012, 1014, 1016, as is described in more detail with reference to a first input signal 1012. The first input signal 1012 is provided to a multi-tap delay 1112 that includes a plurality of serially connected delay elements, where the delay elements provide progressively delayed versions of the input signal 1012. Each delay element may be associated with a unit delay period. A multiplexer 1114 receives the delayed versions of the input signal 1012 and is controlled by a select signal 1110 to provide one of the delayed versions of the input signal 1012 as an output 1022. The select signal 1110 may be provided as a binary number that corresponds to the number of units of delay to be added to the input signal 1012. In some instances, the delay elements of the multi-tap delay 1112 may be implemented using one or more combinational logic gates with an associated propagation delay through the gates. In other instances, the delay elements of the multi-tap delay 1112 may be implemented using flip-flops that provide a delay corresponding to the period of a clock signal that drives the flip-flops. In other instances, delay elements of the multi-tap delay 1112 may be implemented using analog delay elements.

The multiplexer 1114 may be controlled by a select signal 1110 provided by decision logic 1104. The decision logic 1104 may compare the signaling states of the three input signals 1012, 1014, 1016 corresponding to the next symbol interval 1040 (see FIG. 10) with the signaling states of the three outputs 1022, 1024, 1026 corresponding to the current symbol interval 1042, which is stored in a register or flip-flops 1106. The decision logic 1104 may determine the types of signal transitions anticipated for each wire 310a, 310b, 310c at the boundary between the symbol intervals 1040, 1042, and may determine whether the transition region 904 may be expected to exceed a threshold or maximum period. The decision logic 1104 may provide a select signal 1110 to control the multiplexer 1114 in each cell 1102a, 1102b, and 1102c that processes one of the three input signals 1012, 1014, 1016. In one example, a programmable cell 1102a, 1102b, and 1102c may be provided for each of the three input signals 1012, 1014, 1016. In another example, a programmable cell 1102a, 1102b, and/or 1102c may be provided for two of the three input signals 1012, 1014, and/or 1016, with the other input signal 1012, 1014, or 1016 being delayed by a fixed period of time. In the latter example, the two cells 1102a, 1102b, and/or 1102c may be used to adjust the timing of two signals 1012, 1014 and/or 1106 relative to the timing of the third input signal 1012, 1014, or 1016 that has a fixed delay.

Other approaches may be implemented. In one example, an "undriven" output of one or more drivers 308 may be selectively driven at the beginning of a transition with a high drive-strength to quickly achieve the necessary transition.

This assistance may be removed or reduced during the transition, after completion of the transition and/or after the round-trip time over the cable has expired. Temporarily driving the "undriven" output hard may reduce power consumption in the driver. Temporarily driving the "undriven" output may be performed in addition to advancing or retarding edges during transitions.

Figure 12:
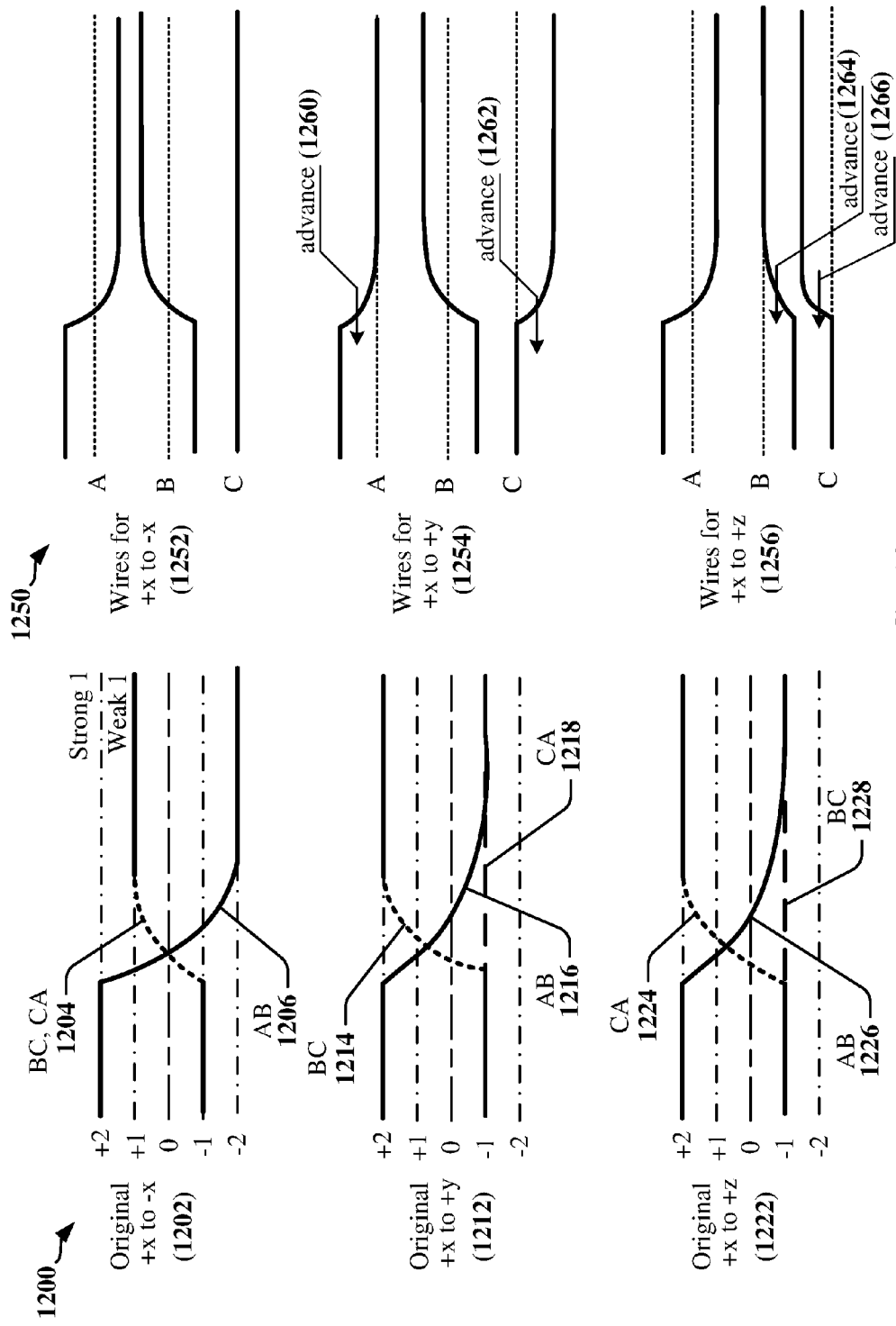
FIG. 12 illustrates an example of the operation of an advance/delay circuit provided according to certain aspects disclosed herein.

FIG. 12 is a set of timing charts 1200 representative of simplified examples of possible transitions from a first state to a second state and timing adjustments that may be applied to improve signaling performance. The initial state may be a driven state, with possible transitions to another driven state or to an undriven state. The timing charts 1202, 1212 and 1222 illustrate the differences between signal wires 310*a*, 310*b* and 310*c* (signals A, B and C, respectively) measurable at the differential receivers 602*a*, 602*b* and 602*c* before and after the signal transitions shown in the set of charts 1250. The timing charts 1202 and 1252 relate to a transition from symbol (+x) 802 to symbol (−x) 812 in which signal A transitions from a +1 state to a −1 state, signal B transitions from a −1 state to a +1 state and signal C remains at a 0 state. Accordingly, a first differential receiver 602*a* may measure a +2 difference before the transition 1206 and a −2 difference after the transition 1206, a second differential receiver 602*b* may measure a −1 difference before the transition 1204 and a +1 difference after the transition 1204, and a third differential receiver 602*c* may measure a 1− difference before the transition 1204 and a +1 difference after the transition 1204. In this example, both transitions 1204 and 1206 have zero-crossings close in time, attributable to the final states being driven states.

The timing charts 1212 and 1254 relate to a transition from symbol (+x) 802 to symbol (+y) 804 in which signal A transitions from a +1 state to a 0 state, signal B transitions from a −1 state to a +1 state and signal C transitions from a 0 state to a −1 state. Accordingly, the first differential receiver 602*a* may measure a +2 difference before the transition 1216 and a −1 difference after the transition 1216, the second differential receiver 602*b* may measure a −1 difference before the transition 1214 and a +2 difference after the transition 1214, and the third differential receiver 602*c* may measure a −1 difference before the transition 1218 and a −1 difference after the transition 1218 (effectively, no transition). In this example, the transitions 1214 and 1216 have zero-crossings that are separated by a significant period of time. The difference may occur because the BC transition 1214 involves two signals that have a final driven state while the AB transition 1216 relates to one signal that has a final undriven state. Corrective action may be taken at the transmitter through the operation of an encoder 306 (see FIG. 3) or other circuits such as line drivers 308. In one example, the beginning of the transition of signal A may be advanced 1260 to accelerate the transition of signal A with respect to signal B, thereby obtaining a faster output transition of differential receiver 602*a*, which compares signals A and B. The beginning of the transition of signal C may also be advanced 1262 to prevent the occurrence of transients, since both signals A and C change and the differential receiver 602*c* compares signals A and C.

The timing charts 1222 and 1256 relate to a transition from symbol (+x) 802 to symbol (+z) 806 in which signal A transitions from a +1 state to a −1 state, signal B transitions from a −1 state to a 0 state and signal C transitions from a 0 state to a +1 state. Accordingly, the first differential receiver 602*a* may measure a +2 difference before the transition 1226 and a −1 difference after the transition 1226, the second differential receiver 602*b* may measure a −1 difference before the transition 1228 and a −1 difference after the transition 1228 (effectively no transition), and the third differential receiver 602*c* may measure a −1 difference before the transition 1224 and a +2 difference after the transition 1224. In this example, the transitions 1224 and 1226 have zero-crossings that are separated by a significant period of time. The difference may be attributed to the CA transition 1224 involving signals A and C that both have a final driven state while the AB transition 1226 involves one signal (the B signal) that has a final undriven state. Corrective action may be taken at the transmitter, typically by an encoder 306, drivers 308 or other circuits adapted according to certain aspects disclosed herein. For example, the beginning of the transition of signal B may be advanced 1264 to accelerate the transition of signal B with respect to signal A, thereby obtaining a faster output transition of differential receiver 602*a*, which compares signals A and B. The beginning of the transition of signal C may also be advanced 1266 to prevent the occurrence of transients, since both signals A and C change and the differential receiver 602*c* compares signals A and C.

The examples illustrated in FIG. 12 describe alignment of transitions for the three state transitions +x to −x, +x to +y and +x to +z. The conditions that occur in these three state transitions may be present in 18 of the 30 possible state transitions shown in FIG. 8, and similar corrective actions may be taken by the transmitter to accelerate these additional state transitions. The illustrated examples describe advancement 1260 and 1264 of signals A and B respectively when those signals are transitioning to the undriven 0 state. In some instances, the transmitter may delay the rising edge of the "B" driver output during +x to +y transitions 1254, for example, in order to align the detection of the state transitions. The transmitter may alternatively or additionally increase the rise or fall times of signals that have a final destination state that is undriven. For example, pre-emphasis circuits in one or more drivers may be activated or a temporarily stronger driver may be used to initially drive a signal to the "un-driven" state Similar techniques may be applied to the +x to +z state transition.

Signals A, B and/or C may be selectively advanced by manipulating one or more clocks used to time the production of the signals in a transmitter. In one example, one or more fewer clock cycles may be used when counting the duration of a state of one wire 310*a*, 310*b* or 310*c* prior to a transition in order to cause the transition to be accelerated. In another example, one or extra clock cycles may be added to the duration of a state of one wire 310*a*, 310*b* or 310*c* prior to a transition in order to delay the transition. Typically, the transmitter may adjust the timing of subsequent symbols to account for the clock cycles that are added or dropped to delay or accelerate the beginning of a signal transition.

Transition times involving wire 310*a*, 310*b* or 310*c* transitioning to the undriven state may be accelerated by initially driving the wire 310*a*, 310*b* or 310*c* towards the undriven state. In some instances, the undriven state may be obtained using passive or active components to pull the wires 310*a*, 310*b* and/or 310*c* towards a predetermined "neutral" voltage level.

Figure 13:
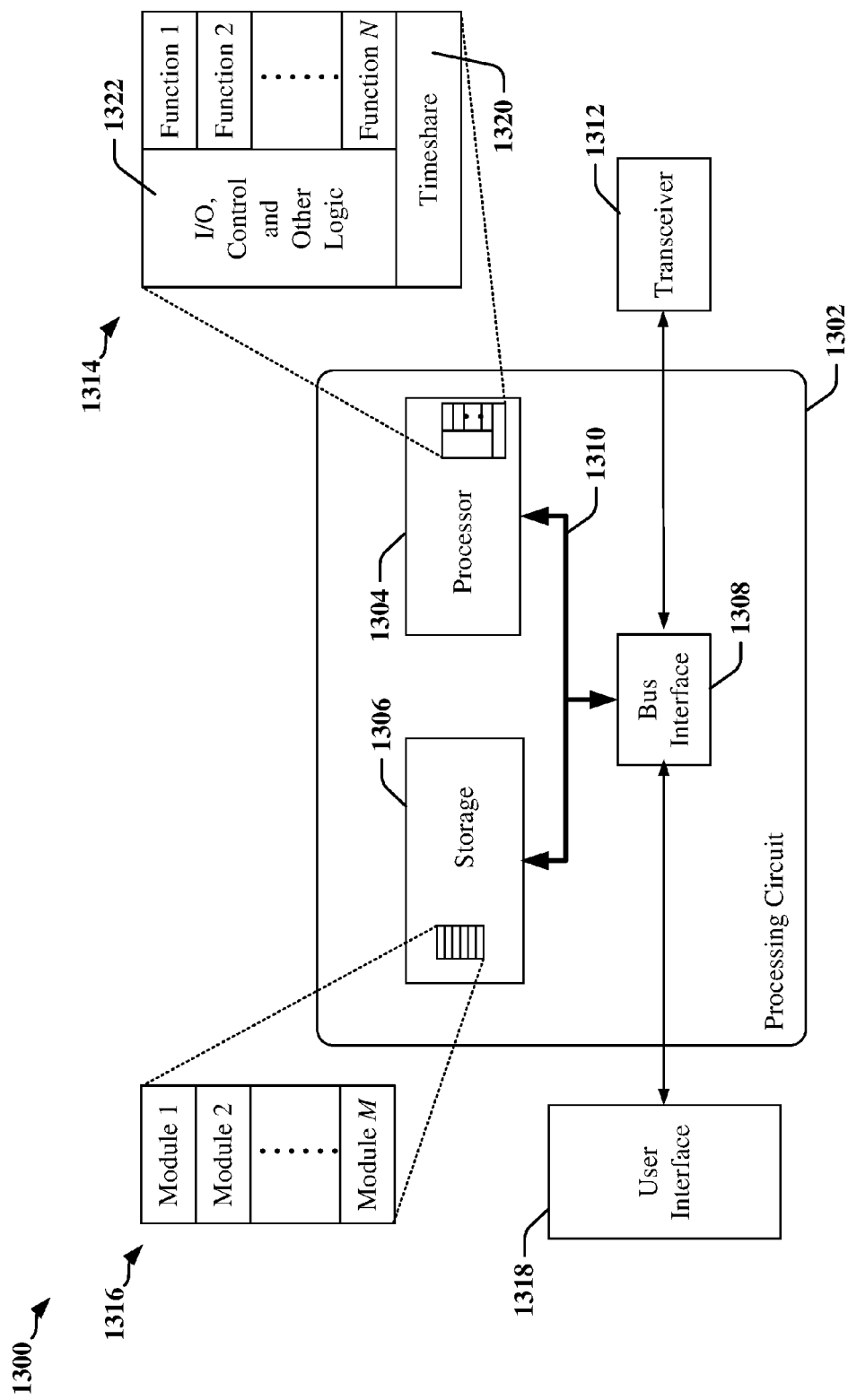
FIG. 13 is a block diagram illustrating an example of an apparatus employing a processing circuit that may be adapted according to certain aspects disclosed herein

FIG. 13 is a conceptual diagram 1300 illustrating a simplified example of a hardware implementation for an apparatus employing a processing circuit 1302 that may be configured to perform one or more functions disclosed herein. In accordance with various aspects of the disclosure, an element, or any portion of an element, or any combination of elements as disclosed herein for three phase clock recovery delay calibration may be implemented using the processing circuit 1302. The processing circuit 1302 may include one or more processors 1304 that are controlled by some combination of hardware and software modules. Examples of processors 1304 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. For example, the processing circuit 1302 may be configured to function as a processor that is adapted to handle encoding and decoding of data for transmission on one or more wireless networks. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media. The bus 1310 may also link various other circuits such as timing sources, timers, peripherals, voltage regulators, and power management circuits. A bus interface 1308 may provide an interface between the bus 1310 and a transceiver 1312. The transceiver 1312 provides a means for communicating with various other apparatus over a transmission medium. Depending upon the nature of the apparatus, a user interface 1318 (e.g., keypad, display, speaker, microphone, joystick) may also be provided, and may be communicatively coupled to the bus 1310 directly or through a bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer readable medium. The computer-readable medium and/or storage 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain software maintained and/or organized in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as the transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to the transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

Figure 14:
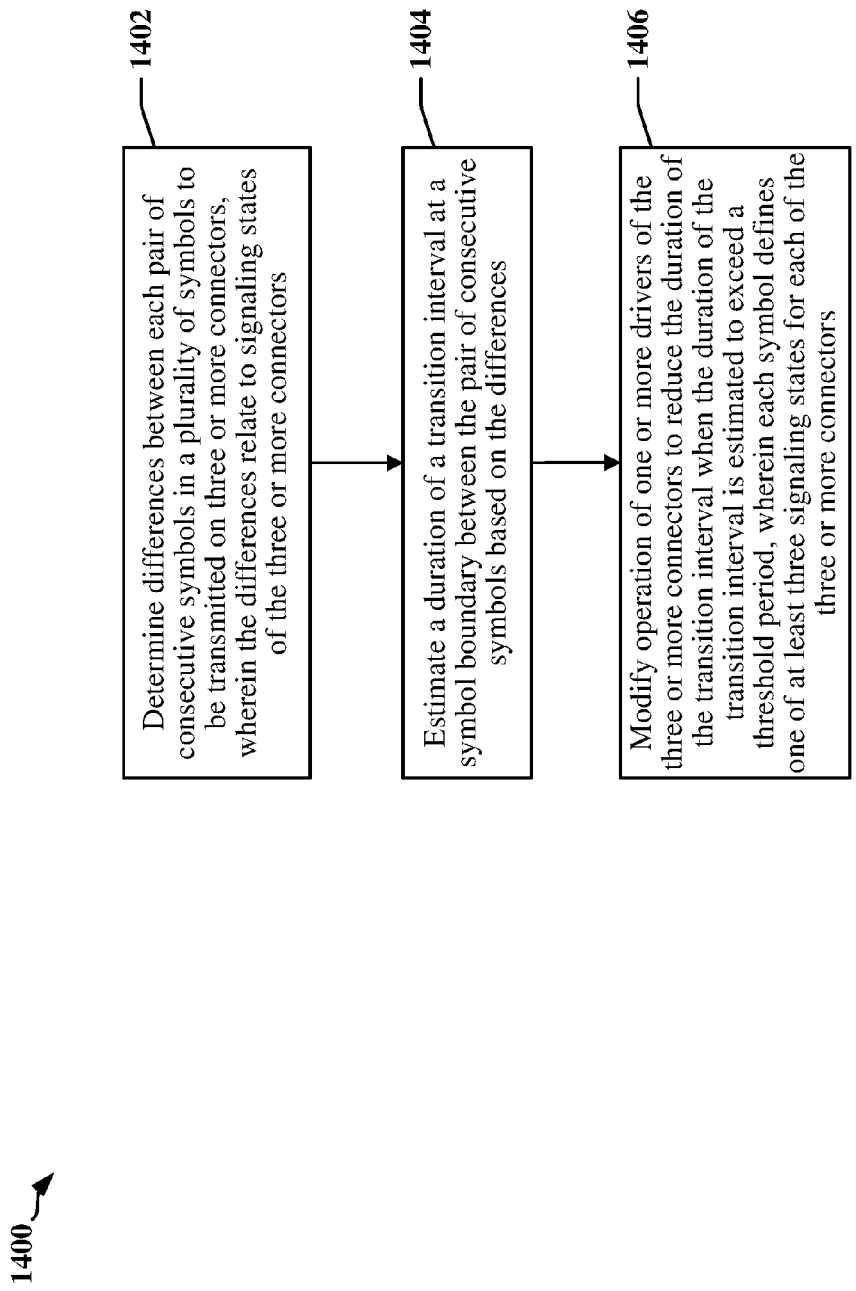
FIG. 14 is a flow chart of a method for M-wire N-phase signal transition alignment.

FIG. 14 is a flowchart illustrating an encoding method according to certain aspects of the invention. The method may be performed by a device 202, 230 which may be a component of an apparatus. At step 1402, the device 202, 230 may determine differences between each pair of consecutive symbols in a plurality of symbols to be transmitted on three or more connectors. The differences between each pair of consecutive symbols may relate to signaling states of the three or more connectors. The three or more connectors may include at least three wires and at least one wire is in an undriven state during transmission of each symbol.

At step 1404, the device 202, 230 may estimate a duration of a transition interval at a symbol boundary between the pair of consecutive symbols based on the differences.

At step 1406, the device 202, 230 may modify operation of one or more drivers of the three or more connectors to reduce the duration of the transition interval when the duration of the transition interval is estimated to exceed a threshold period. Each symbol may define one of at least three signaling states for each of the three or more connectors. The device 202, 230 may modify operation of the one or more drivers by causing temporal alignment of two or more outputs of state transition detection circuits in a receiver. The state transition detection circuits may be configured to compare signaling states of different pairs of the three or more connectors. Causing temporal alignment may include causing transitions to occur within a time period that is less than the threshold period.

In one example, the device 202, 230 may modify operation of the one or more drivers by configuring one or more delays to cause the driver to initiate a state transition on a first connector before a corresponding state transition is initiated on a second connector.

In another example, the device 202, 230 may modify operation of the one or more drivers by configuring one or more delays to cause the driver to initiate a state transition on a first connector after a corresponding state transition is initiated on a second connector.

In another example, the device 202, 230 may modify operation of the one or more drivers by configuring one or more delays to cause the driver to delay or advance initiation of a state transition on a first connector with respect to initiation of a corresponding state transition on a second connector.

In another example, the device 202, 230 may modify operation of the one or more drivers by delaying or advancing an initiation of a state transition on at least one connector when the duration of the transition interval is estimated to exceed the threshold period. The device 202, 230 may refrain from delaying or advancing state transitions on the three or more connectors when the duration of the transition interval is estimated to be less than the threshold period.

In another example, the device 202, 230 may modify operation of the one or more drivers by actively driving one connector during at least a portion of the transition interval when the duration of the transition interval is estimated to exceed the threshold period. The device 202, 230 may refrain from driving the one connector while a second symbol of the pair of consecutive symbols is transmitted when the duration of the transition interval is estimated to be less than the threshold period.

In one example, the device 202, 230 may estimate the duration of the transition interval by determining a signaling state transition time for each of the three or more connectors relative to the symbol boundary, and estimating delays between the symbol boundary and transitions in outputs of each of a plurality of differential receivers at a receiver. Each of the plurality of differential receivers may be coupled to a different pair of the three or more connectors.

Figure 15:
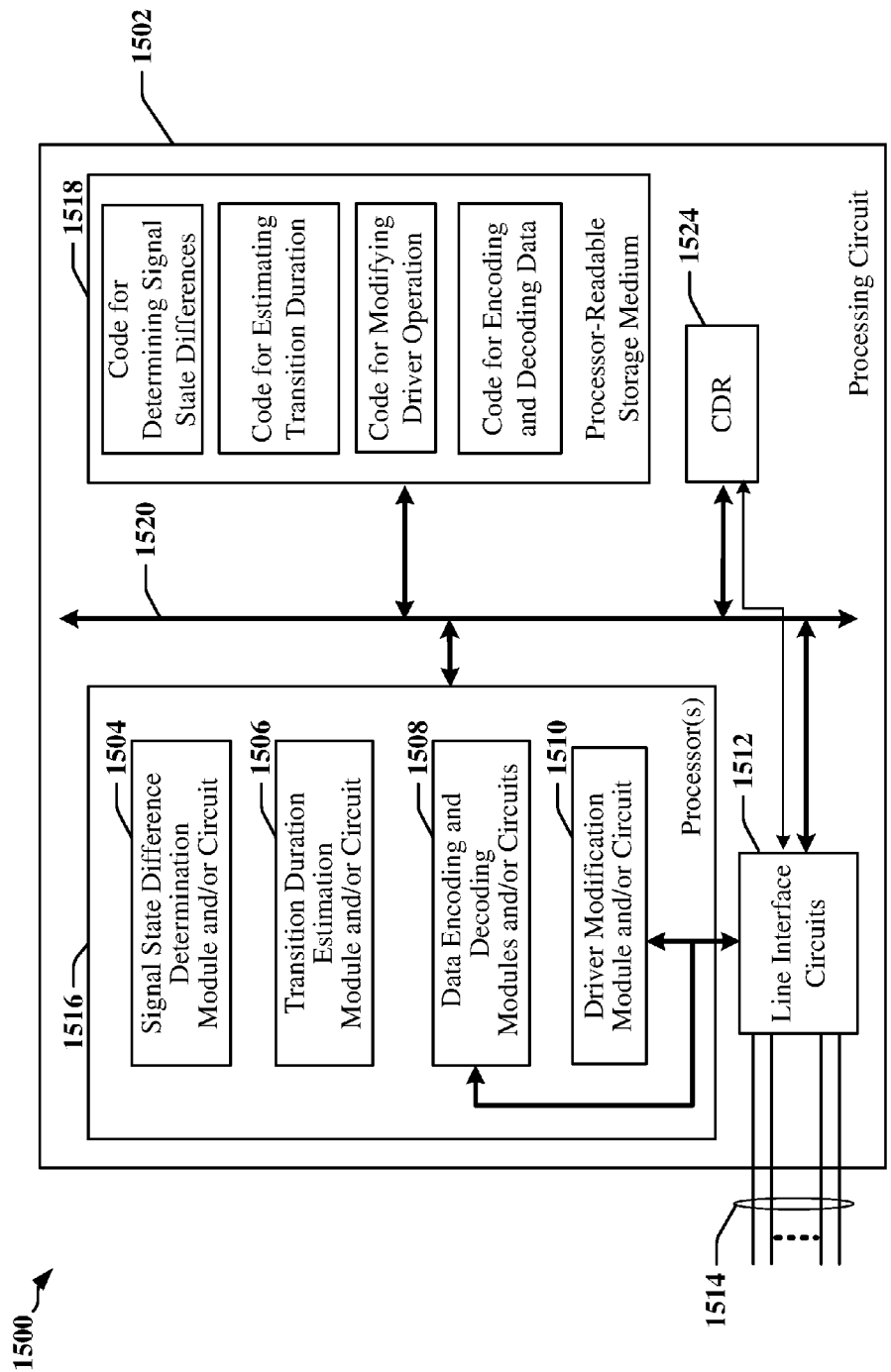
FIG. 15 is a diagram illustrating an example of a hardware implementation for an apparatus employing M-wire N-phase signal transition alignment.

FIG. 15 is a diagram illustrating a simplified example of a hardware implementation for an apparatus 1500 employing a processing circuit 1502. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules or circuits 1504, 1506 and 1508, line interface circuits 1512 configurable to drive connectors or wires 1514 of a multi-wire interface, and the computer-readable storage medium 1518. The bus 1520 may also link various other circuits such as timing sources, peripherals, voltage regulators, and power management circuits. In one example, the bus 1520 provides access to a CDR circuit 1524, which may cooperate with line interface circuits 1512 to generate receive clocks and capture symbols from the connectors or wires 1514.

The processor 1516 may include a microprocessor, a controller, a digital signal processor, a sequencer, a state machine, etc. The processor 1516 is responsible for general processing, including the execution of software stored on the computer-readable storage medium 1518. The software, when executed by the processor 1516, causes the processing circuit 1502 to perform the various functions described supra for any particular apparatus. The computer-readable storage medium 1518 may also be used for storing data that is manipulated by the processor 1516 when executing software. The processing circuit 1502 further includes at least one of the modules 1504, 1506, 1508 and 1510. The modules 1504, 1506, 1508, and/or 1510 may be software modules running in the processor 1516, resident/stored in the computer-readable storage medium 1518, one or more hardware modules coupled to the processor 1516, or some combination thereof.

In one configuration, the apparatus 1500 for wireless communication includes a module or circuit 1504 configured to determine differences related to signaling states of three or more connectors 1514 between each pair of consecutive symbols in a plurality of symbols to be transmitted on three or more connectors 1514, a module or circuit 1506 configured to estimate a duration of a transition interval at a symbol boundary between the pair of consecutive symbols based on the differences, and a module or circuit 1510 configured modify operation of one or more drivers of the three or more connectors to reduce the duration of the transition interval when the duration of the transition interval is estimated to exceed a threshold period. Each symbol may define one of at least three signaling states for each of the three or more connectors. The apparatus 1500 may include modules and/or circuits 1508 for encoding and/or decoding data transmitted over the three or more connectors 1514, as well as a CDR circuit 1524 or other circuits used to receive and/or transmit symbols on the three or more connectors 1514. The aforementioned modules or circuits 1504, 1506, 1508, 1510 may be implemented, for example, using a processing circuit 1302 (see FIG. 13) that is configured to operate as some combination of a processor 206 or 236, physical layer drivers 210 or 240 and storage media 208 and 238.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communications, comprising:
    determining a transition in signaling state of three wires of a communication link between a pair of consecutive symbols transmitted on the communication link, wherein each symbol defines a different signaling state of the three wires of the communication link; and
    selectively increasing driver strength prior to the transition in signaling state of the three wires when the transition in signaling state includes a change in signaling state of a corresponding wire on which a signal is transmitted,
    wherein during transmission of a first symbol in the pair of consecutive symbols, a first wire of the three wires and a second wire of the three wires are at voltage levels that have different polarities from one another, and
    wherein during transmission of a second symbol in the pair of consecutive symbols, the first wire and a third wire of the three wires are at the voltage levels that have different polarities from one another.

2. The method of claim 1, wherein during transmission of the first symbol the third wire has a voltage that lies substantially halfway between voltage levels of the first wire and the second wire.

3. The method of claim 1, wherein driver strength is increased when the change in signaling state of the corresponding wire includes a polarity change of the signal.

4. The method of claim 1, wherein driver strength is not increased when the change in signaling state of the corresponding wire does not include a polarity change of the signal.

5. The method of claim 1, and further comprising:
    initiating transmission of the second symbol on one wire before transmission of the first symbol is terminated.

6. The method of claim 1, and further comprising:
    initiating transmission of the second symbol on one wire after transmission of the first symbol is terminated.

7. The method of claim 1, wherein driver strength is increased or not increased based on signaling state of all three wires after the transition.

8. The method of claim 7, wherein driver strength is increased or not increased based on changes in relative signaling states of each pairing of wires in the three wires.

9. The method of claim 7, wherein driver strength is increased or not increased based on changes in signaling state of all three wires.

10. The method of claim 7, wherein increasing driver strength comprises:
    adding pre-emphasis to one or more driver outputs based on prior knowledge of a type of transition in signaling state of the three wires of the communication link between the pair of consecutive symbols.

11. An apparatus, comprising:
    means for determining a transition in signaling state of three wires of a communication link between a pair of consecutive symbols transmitted on the communication link, wherein each symbol defines a different signaling state of the three wires of the communication link; and
    means for selectively increasing driver strength prior to the transition in signaling state of the three wires when the transition in signaling state includes a change in signaling state of a corresponding wire on which a signal is transmitted,
    wherein during transmission of a first symbol in the pair of consecutive symbols, a first wire of the three wires and a second wire of the three wires are at voltage levels that have different polarities from one another, and
    wherein during transmission of a second symbol in the pair of consecutive symbols, the first wire and a third wire of the three wires are at the voltage levels that have different polarities from one another.

12. The apparatus of claim 11, wherein during transmission of the first symbol the third wire has a voltage that lies substantially halfway between voltage levels of the first wire and the second wire.

13. The apparatus of claim 11, wherein driver strength is increased when the change in signaling state of the corresponding wire includes a polarity change of the signal, and wherein driver strength is increased when the change in signaling state of the corresponding wire includes a polarity change of the signal.

14. The apparatus of claim 11, further comprising:
    means for selectively initiating transmission of the second symbol on one wire before or after transmission of the first symbol is terminated.

15. The apparatus of claim 11, wherein driver strength is increased or not increased based on signaling state of all three wires after the transition.

16. The apparatus of claim 11, wherein driver strength is increased or not increased based on changes in relative signaling states of each pairing of wires in the three wires.

17. The apparatus of claim 16, wherein driver strength is increased or not increased based on changes in signaling state of all three wires.

18. The apparatus of claim 16, wherein the means for selectively increasing driver strength is configured to add pre-emphasis to one or more driver outputs based on prior knowledge of a type of transition in signaling state of the three wires of the communication link between the pair of consecutive symbols.

19. An apparatus, comprising:
a processing circuit configured to:
   determine a transition in signaling state of three wires of a communication link between a pair of consecutive symbols transmitted on the communication link, wherein each symbol defines a different signaling state of the three wires of the communication link; and
   selectively increase driver strength prior to the transition in signaling state of the three wires when the transition in signaling state includes a change in signaling state of a corresponding wire on which a signal is transmitted,
wherein during transmission of a first symbol in the pair of consecutive symbols, a first wire of the three wires and a second wire of the three wires are at voltage levels that have different polarities from one another, and
wherein during transmission of a second symbol in the pair of consecutive symbols, the first wire and a third wire of the three wires are at the voltage levels that have different polarities from one another.

20. The apparatus of claim 19, wherein driver strength is increased when the change in signaling state of the corresponding wire includes a polarity change of the signal, and wherein driver strength is increased when the change in signaling state of the corresponding wire includes a polarity change of the signal.

21. The apparatus of claim 19, wherein the processing circuit is configured to:
   selectively initiate transmission of the second symbol on one wire before or after transmission of the first symbol is terminated.

22. The apparatus of claim 19, wherein the processing circuit is configured to pre-emphasize the signal by initiating the transmission of the second symbol before the transmission of the first symbol is terminated.

23. The apparatus of claim 19, wherein driver strength is increased or not increased based on changes in relative signaling states of each pairing of wires in the three wires.

24. The apparatus of claim 19, wherein the processing circuit is configured to:
   add pre-emphasis to one or more driver outputs based on prior knowledge of a type of transition in signaling state of the three wires of the communication link between the pair of consecutive symbols.

25. A non-transitory processor-readable storage medium having one or more instructions which, when executed by at least one processing circuit, cause the at least one processing circuit to:
   determine a transition in signaling state of three wires of a communication link between a pair of consecutive symbols transmitted on the communication link, wherein each symbol defines a different signaling state of the three wires of the communication link; and
   selectively increase driver strength prior to the transition in signaling state of the three wires when the transition in signaling state includes a change in signaling state of a corresponding wire on which a signal is transmitted,
wherein during transmission of a first symbol in the pair of consecutive symbols, a first wire of the three wires and a second wire of the three wires are at voltage levels that have different polarities from one another, and
wherein during transmission of a second symbol in the pair of consecutive symbols, the first wire and a third wire of the three wires are at the voltage levels that have different polarities from one another.

26. The non-transitory storage medium of claim 25, wherein during transmission of the first symbol the third wire has a voltage that lies substantially halfway between voltage levels of the first wire and the second wire.

27. The non-transitory storage medium of claim 25, driver strength is increased when the change in signaling state of the corresponding wire includes a polarity change of the signal.

28. The non-transitory storage medium of claim 25, further comprising instructions that cause the at least one processing circuit to:
   initiate transmission of the second symbol on one wire before the transmission of the first symbol is terminated.

29. The non-transitory storage medium of claim 25, further comprising instructions that cause the at least one processing circuit to:
   initiate transmission of the second symbol on one wire after the transmission of the first symbol is terminated.

30. The non-transitory storage medium of claim 25, further comprising instructions that cause the at least one processing circuit to:
   add pre-emphasis to one or more driver outputs based on prior knowledge of a type of transition in signaling state of the three wires of the communication link between the pair of consecutive symbols.

* * * * *